US011754662B2

(12) United States Patent
Schwartz et al.

(10) Patent No.: US 11,754,662 B2
(45) Date of Patent: *Sep. 12, 2023

(54) SYSTEMS AND METHODS FOR PARTITIONING A VIDEO FEED TO SEGMENT LIVE PLAYER ACTIVITY

(71) Applicant: Tempus Ex Machina, Inc., San Francisco, CA (US)

(72) Inventors: Erik Schwartz, Los Altos Hills, CA (US); Michael Naquin, Alamo, CA (US); Christopher Brown, Atlanta, GA (US); Steve Xing, San Francisco, CA (US); Pawel Czarnecki, San Francisco, CA (US); Charles D. Ebersol, Atlanta, GA (US)

(73) Assignee: Tempus Ex Machina, Inc., San Francisco, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/467,082

(22) Filed: Sep. 3, 2021

(65) Prior Publication Data

US 2021/0400201 A1 Dec. 23, 2021

Related U.S. Application Data

(63) Continuation of application No. 16/747,440, filed on Jan. 20, 2020, now Pat. No. 11,140,328.
(Continued)

(51) Int. Cl.
*G01S 5/02* (2010.01)
*G06V 20/40* (2022.01)
(Continued)

(52) U.S. Cl.
CPC .......... *G01S 5/0226* (2013.01); *G06V 10/764* (2022.01); *G06V 20/42* (2022.01);
(Continued)

(58) Field of Classification Search
CPC .. G01S 2205/08; G01S 5/0226; G01S 5/0264; G01S 3/00; G06F 18/2413;
(Continued)

(56) References Cited

U.S. PATENT DOCUMENTS 8,019,271 B1 9/2011 Izdepski
8,477,046 B2 7/2013 Alonso
(Continued)

FOREIGN PATENT DOCUMENTS

CN 102428458 4/2012
CN 107005654 8/2017
(Continued)

*Primary Examiner* — Christopher S Kelley
*Assistant Examiner* — Ana Picon-Feliciano
(74) *Attorney, Agent, or Firm* — Van Pelt, Yi & James LLP

(57) ABSTRACT

A process to partition a video feed to segment live player activity includes receiving, on a first recurring basis, a transmission of a central video feed from a first camera. The central video feed is calibrated against a spatial region represented in at least two dimensions that is encompassed by the central video feed. The process includes receiving, on a second recurring basis, a respective time-stamped position information from each tracking device in a plurality of tracking devices. Each tracking device is worn by a corresponding subject on the spatial region and transmits positional information that describes a time-stamped position of the corresponding subject in the spatial region. The process uses the received information and the calibration to define a first sub-view of the central video feed associated with a first subject. The first sub-view comprises a corresponding subframe associated with the first subject.

20 Claims, 12 Drawing Sheets

Related U.S. Application Data

(60) Provisional application No. 62/802,186, filed on Feb. 6, 2019, provisional application No. 62/795,020, filed on Jan. 22, 2019.

(51) Int. Cl.
  *H04N 23/695* (2023.01)
  *H04N 23/61* (2023.01)
  *H04N 23/661* (2023.01)
  *G06V 10/764* (2022.01)

(52) U.S. Cl.
  CPC .......... *H04N 23/61* (2023.01); *H04N 23/661* (2023.01); *H04N 23/695* (2023.01); *G06V 20/44* (2022.01)

(58) Field of Classification Search
  CPC ...... G06F 3/017; G06V 10/764; G06V 20/42; G06V 20/44; G06K 2009/00738; G06K 9/00724; G06K 9/00; G06K 9/00355; G06K 9/627; G06T 7/215; G06T 2207/10016; G06T 7/11; H04H 60/07; H04N 23/61; H04N 23/661; H04N 23/695; H04N 23/90; H04N 5/23206; H04N 5/23218; H04N 5/23299; H04N 5/247
  USPC .......................................................... 348/169
  See application file for complete search history.

(56) References Cited

U.S. PATENT DOCUMENTS

| | | | |
|---|---|---|---|
| 9,138,652 | B1 | 9/2015 | Thompson |
| 9,761,081 | B2 | 9/2017 | Barclay |
| 10,051,343 | B2 | 8/2018 | Wolf |
| 11,140,328 | B2 * | 10/2021 | Schwartz ............... H04N 23/61 |
| 2003/0033157 | A1 | 2/2003 | Dempski |
| 2010/0194892 | A1 | 8/2010 | Hikita |
| 2013/0066448 | A1 | 3/2013 | Alonso |
| 2015/0154823 | A1 | 6/2015 | Barclay |
| 2015/0258416 | A1 | 9/2015 | Ianni |
| 2015/0297949 | A1 | 10/2015 | Aman |
| 2015/0375117 | A1 | 12/2015 | Thompson |
| 2016/0101358 | A1 | 4/2016 | Ibrahim |
| 2016/0191945 | A1 | 6/2016 | Gurbuz |
| 2016/0354633 | A1 | 12/2016 | Schauermann |
| 2017/0032191 | A1 | 2/2017 | Ackland |
| 2017/0083769 | A1 | 3/2017 | Van Rensburg |
| 2017/0201793 | A1 | 7/2017 | Pereira |
| 2017/0264920 | A1 | 9/2017 | Mickelsen |
| 2018/0161680 | A1 | 6/2018 | Thompson |
| 2018/0199080 | A1 | 7/2018 | Jackson, Jr. |
| 2018/0343489 | A1 | 11/2018 | Loheide |
| 2019/0082233 | A1 | 3/2019 | Love |

FOREIGN PATENT DOCUMENTS

| | | |
|---|---|---|
| CN | 107623838 | 1/2018 |
| CN | 108028908 | 5/2018 |
| JP | 2003348424 | 12/2003 |
| JP | 2004235734 | 8/2004 |
| JP | 2005184266 | 7/2005 |
| JP | 2008167127 | 7/2008 |
| JP | 2016005015 | 1/2016 |
| JP | 2018028864 | 2/2018 |
| WO | 2011021632 | 2/2011 |
| WO | 2016199527 | 12/2016 |
| WO | 2018017936 | 1/2018 |
| WO | 2018053257 | 3/2018 |

* cited by examiner

800

SYSTEMS AND METHODS FOR PARTITIONING A VIDEO FEED TO SEGMENT LIVE PLAYER ACTIVITY

CROSS REFERENCE TO OTHER APPLICATIONS

This application is a continuation of U.S. patent application Ser. No. 16/747,440, entitled SYSTEMS AND METHODS FOR PARTITIONING A VIDEO FEED TO SEGMENT LIVE PLAYER ACTIVITY filed Jan. 20, 2020 which is incorporated herein by reference for all purposes, which claims priority to U.S. Provisional Patent Application No. 62/795,020, entitled SYSTEMS AND METHODS FOR PARTITIONING A VIDEO FEED TO SEGMENT LIVE PLAYER ACTIVITY filed Jan. 22, 2019, and claims priority to U.S. Provisional Patent Application No. 62/802,186, entitled SYSTEMS AND METHODS FOR PARTITIONING A VIDEO FEED TO SEGMENT LIVE PLAYER ACTIVITY filed Feb. 6, 2019, both of which are incorporated herein by reference for all purposes.

BACKGROUND OF THE INVENTION

Conventional camera tracking systems track an object via an analysis of the subject matter that is captured by each respective camera. For instance, a series of images is captured by a camera, and these images are analyzed to determine optical characteristics of an object that is tracked, such as identifying a color associated with the object or a silhouette of the object. These optical characteristics are recognized in further images, allowing the object to be tracked through the progression of the series of images. However, these conventional systems are susceptible to losing track of the object if the object quickly darts out of a line of sight of the camera or if there are multiple objects in the line of sight of the camera that are optically similar to the desired object. Hence, there is a need for improved object tracking and display systems.

BRIEF SUMMARY

Techniques (including a system, a processor, and a computer program product) to partition a video feed to segment live player activity are disclosed. In various embodiments, a process to partition a video feed to segment live player activity includes receiving, on a first recurring basis, a transmission of a central video feed from a first camera. The central video feed calibrated against a spatial region represented in at least two dimensions that is encompassed by the central video feed. The process receives, on a second recurring basis, a respective time-stamped position information from each tracking device in a plurality of tracking devices, wherein each tracking device in the plurality of tracking devices (a) is worn by a corresponding subject in a plurality of subjects participating in a competition on the spatial region and (b) transmits positional information that describes a time-stamped position of the corresponding subject in the spatial region. The process uses the received time-stamped position information and the calibration of the central video feed to define a first sub-view of the central video feed. The first sub-view is associated with a first subject included in the plurality of subjects and the first sub-view comprising for each of a plurality of frames comprising the central video feed a corresponding sub-frame associated with the first subject. The process causes the first sub-view to be communicated to a device configured to display the first sub-view.

Techniques to partition a video feed to segment live player activity are disclosed. These techniques enable subject matter of interest to be better tracked compared with conventional object tracking methods. In this regard, a central video feed can be partitioned into sub-views of a subject of interest. For example, a video feed of a view of a football game on a playing field is partitioned into isolation shots of a specific player or group of players allowing a spectator (e.g., a fan, coach, etc.) to track the specific player or group of players throughout the game. Conventionally, when a camera pans away from a specific player, a spectator can no longer keep track of that specific player. By using the techniques for partitioning a video feed disclosed herein, a spectator can visually track a specific player throughout the game without interruption.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
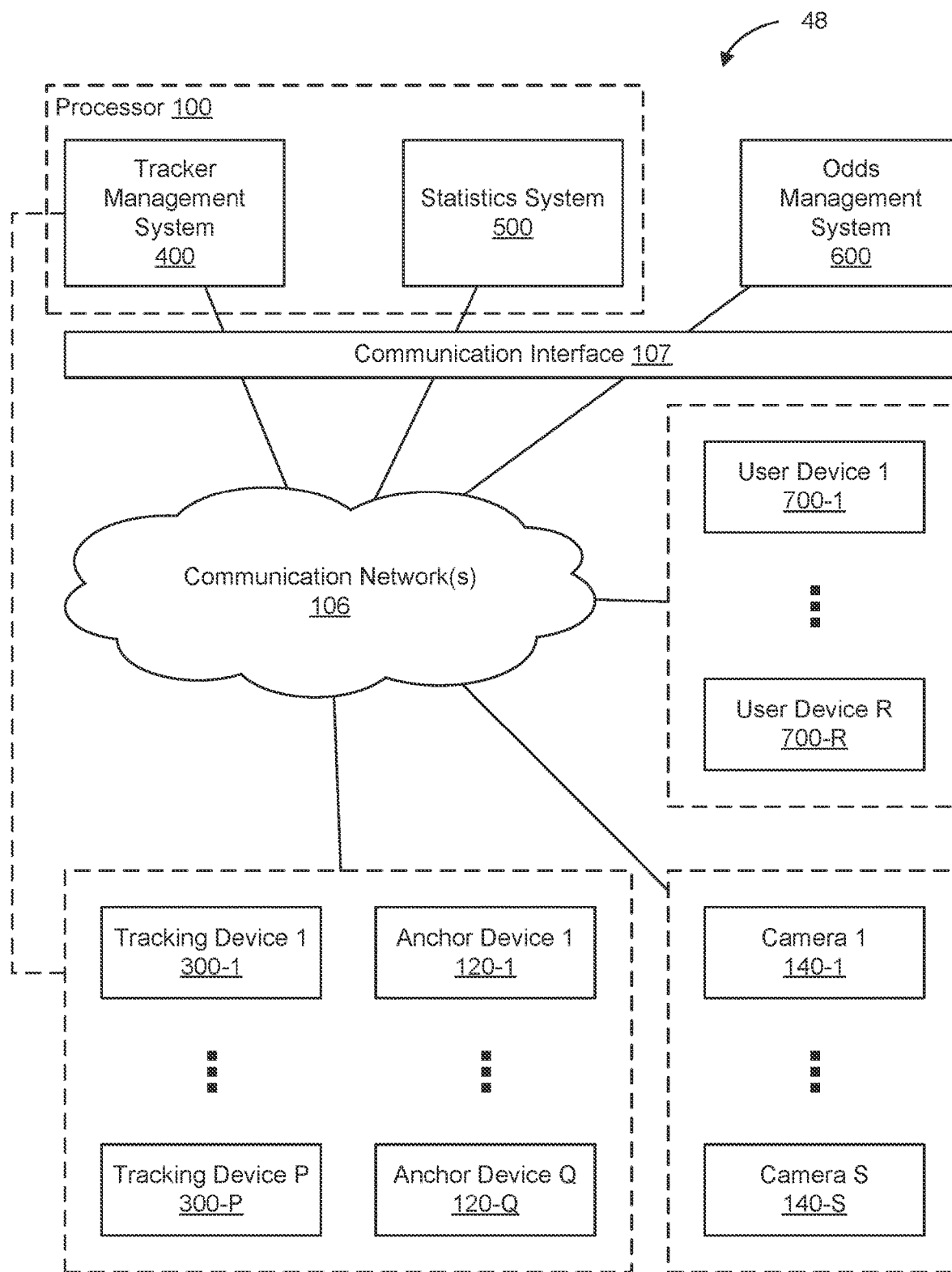
FIG. 1 is a block diagram illustrating an embodiment of a system for partitioning a video feed to segment live player activity.

FIG. 1 is a block diagram illustrating an embodiment of a system for partitioning a video feed to segment live player activity. This exemplary system 48 partitions a video feed such as a video feed of a competition between a first competitor and a second competitor. The first competitor includes a first set of one or more participants and a second competitor includes a second set of one or more participants. System 48 includes communication interface 107 and processor 100. Communication interface 107 is configured to receive time-stamped position information of one or more participants of one or both of the first set of participant(s) and the second set of participant(s) in the competition. In various embodiments, the time-stamped position information is captured by a telemetry tracking system during the competition. In this example, the telemetry tracking system is made up of tracking device(s) 300-1 to 300-P, anchor device(s) 120-1 to 120-Q, and optionally camera(s) 140-1 to 140-S, which are managed by tracker management system 400 as further described below.

Processor 100 is coupled to communication interface 107 and configured to calculate, e.g., while the present competition is ongoing, a first covariate parameter for each of one or more participants in one or both of the first set of participants and the second set of participants at and/or as of a point in time. Each respective first covariate parameter is derived from the time-stamped position information of a corresponding participant of the first or second set of one or more participants in the present competition at the point in time.

In various embodiments, processor 100 includes tracking management system 400 for tracking a plurality of subjects and statistics system 500 for managing various statistics. Tracking device management system 400 facilitates managing of one or more tracking devices 300 and one or more anchor devices 120 of the system. Statistics system 500 stores and/or generates various statistics for use in predicting an outcome at a competition such as a live sports event, providing odds for wagering on various circumstances or outcomes in the sports event, and other similar activities. In various embodiments, tracking management system 400 and statistics system 500 comprise software engines or modules running on processor 100 and/or separate or potentially separate systems, each comprising and/or running on one or more processors comprising processor 100.

In various embodiments, system 48 includes odds management system 600 for managing odds and a plurality of user devices 700-1 to 700-R. Although odds management system 600 is shown external to processor 100, in some embodiments the odds management system is included in the processor. Odds management system 600 facilitates determining odds for outcomes in a sports event and managing various models related to predicting outcomes at the live event.

In some embodiments, the system includes one or more user devices 700 that facilitate end user interaction with various systems of the present disclosure, such as odds management system 600. Moreover, in some embodiments, system 48 includes one or more cameras 140 that capture live images and/or video of a live event that is then utilized by the systems of the present disclosure. In some embodiments, the cameras 140 include one or more high resolution cameras. By way of non-limiting example, the one or more high resolution cameras includes a camera with a 1080p resolution, 1440p resolution, 2K resolution, 4K resolution, or 8K resolution. Utilizing a camera 140 with a high resolution allows for a video feed captured by the camera to be partitioned at a higher resolution, while also allowing for more partitions to be created without a noticeable decline in image quality.

The above-identified components are interconnected, optionally through a communications network. Elements in dashed boxes are optional combined as a single system or device. Of course, other topologies of the computer system 48 are possible. For instance, in some implementations, any of the illustrated devices and systems can in fact constitute several computer systems that are linked together in a network, or be a virtual machine or a container in a cloud computing environment. Moreover, in some embodiments rather than relying on a physical communications network 106, the illustrated devices and systems wirelessly transmit information between each other. As such, the exemplary topology shown in FIG. 1 merely serves to describe the features of an embodiment of the present disclosure in a manner that will be readily understood to one of skill in the art.

In some implementations, the communication network 106 interconnects tracking device management system 400 that manages one or more tracking devices 300 and one or more anchors 120, statistics system 500, odds management system 600, one or more user devices 700, and one or more cameras 140 with each other, as well as optional external systems and devices. In some implementations, the communication network 106 optionally includes the Internet, one or more local area networks (LANs), one or more wide area networks (WANs), other types of networks, or a combination of such networks.

Examples of networks 106 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In various embodiments, processor 100 includes a machine learning engine 210 (not shown in FIG. 1) that facilitates the prediction of the outcome of a competitions. The next figure describes an example of processor 100 that includes a machine learning engine in greater detail.

Figure 2A:
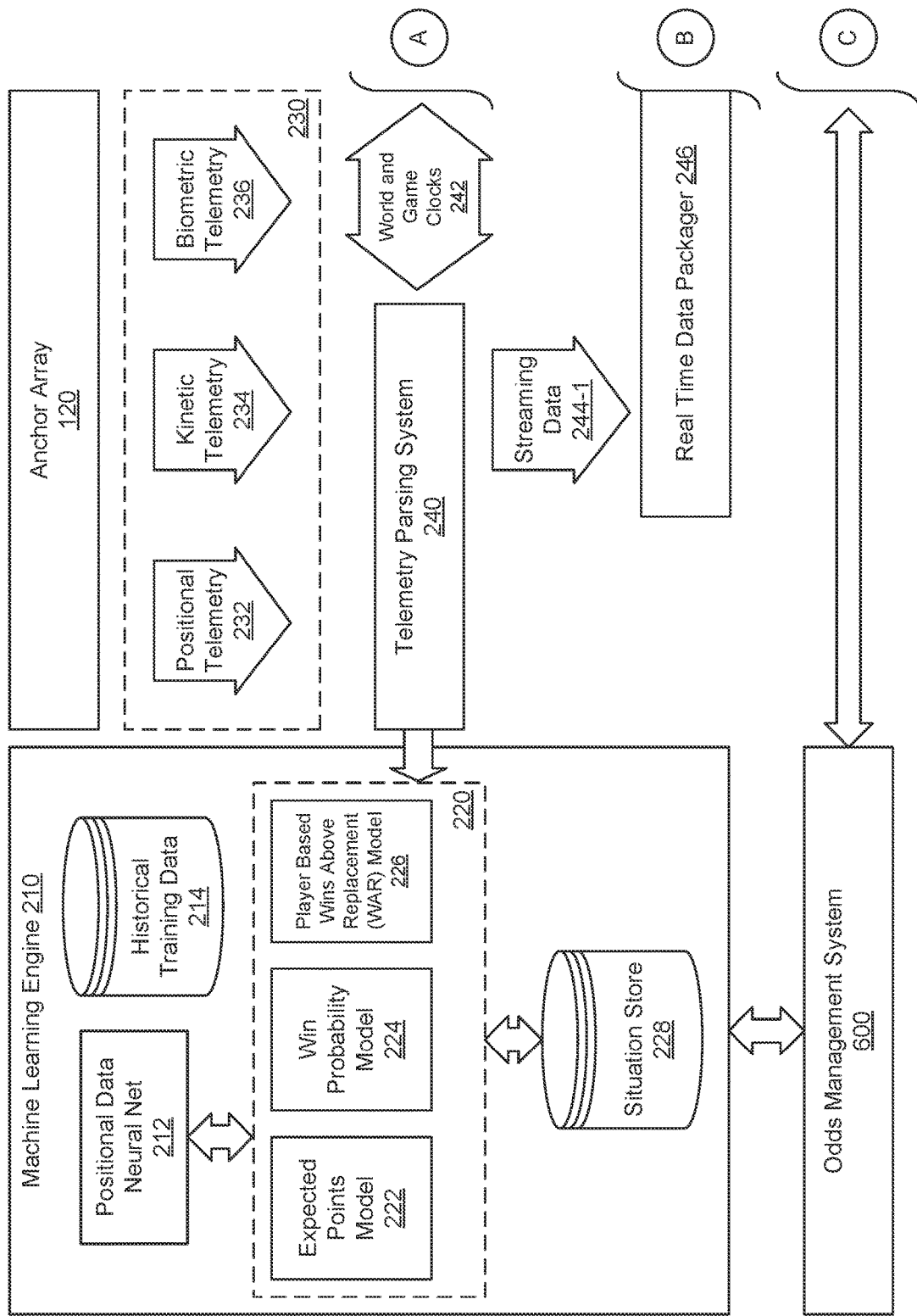
FIG. 2A shows a block diagram illustrating an embodiment of a system for partitioning a video feed to segment live player activity.
Figure 2B:
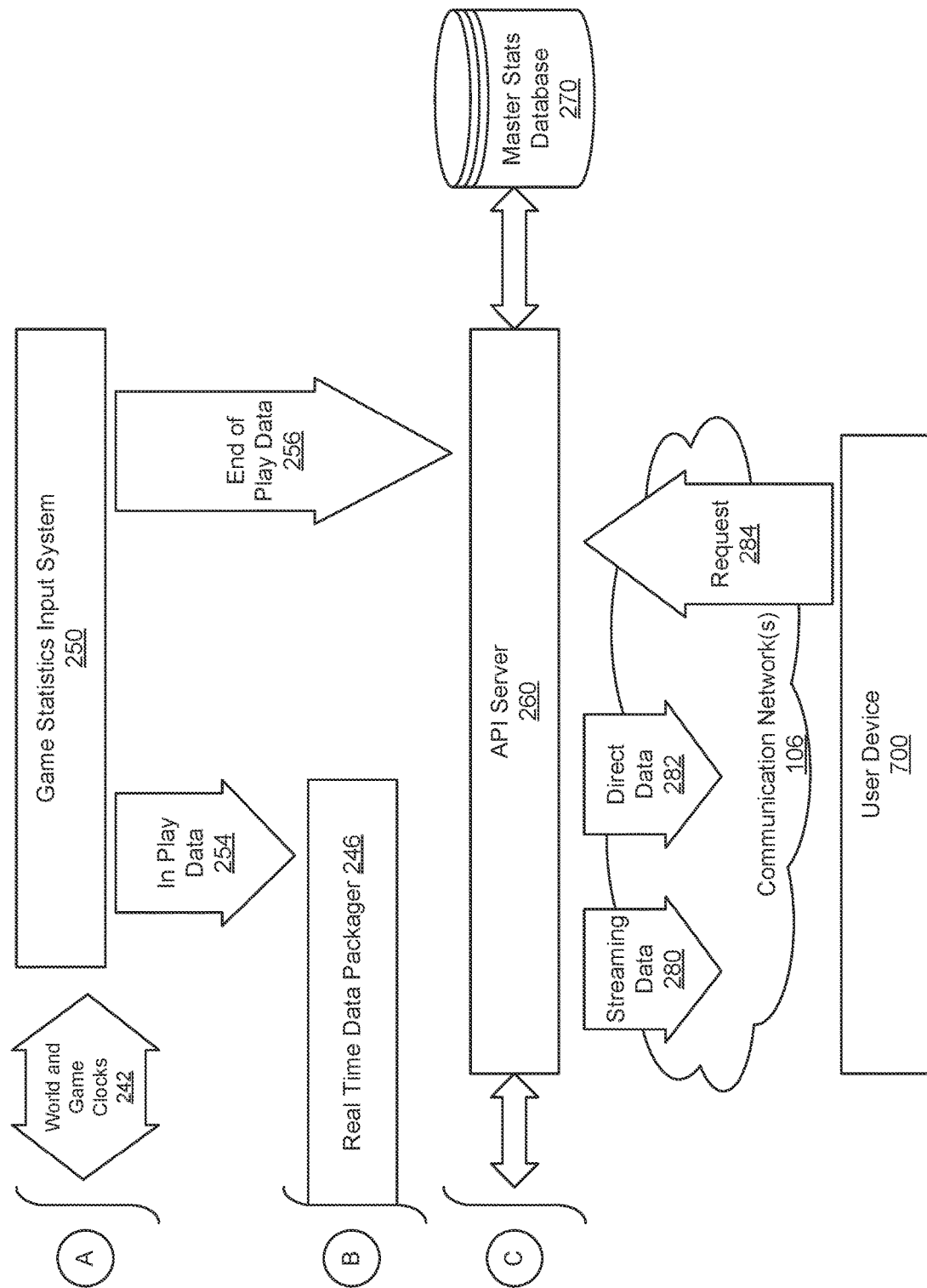
FIG. 2B shows a block diagram illustrating an embodiment of a system for partitioning a video feed to segment live player activity.

FIGS. 2A and 2B show a block diagram illustrating an embodiment of a system for partitioning a video feed to segment live player activity. As depicted in FIG. 2A, an array of anchor devices 120 receives telemetry data 230 from one or more tracking devices 300. In order to minimize error in receiving the telemetry from the one or more tracking devices 300, the array of anchor devices 120 preferably includes at least three anchor devices. Inclusion of at least three anchor devices 120 within the array of anchor devices allow for each ping (e.g., telemetry data 230) received from a respective tracking device 300 to be triangulated using the combined data from the at least three anchor that receive the respective ping. Additional details and information regarding systems and methods for receiving pings from tracking devices and the optimization thereof will be described in more detail infra, with particular reference to at least FIGS. 3 and 4.

In the example shown, the telemetry data 230 that is received by the array of anchors 120 from the one or more tracking devices 300 includes positional telemetry data 232. The positional telemetry data 232 provides location data for a respective tracking device 300, which describes a location of the tracking device within a spatial region. In some embodiments, this positional telemetry data 232 is provided as one or more Cartesian coordinates (e.g., an X coordinate, a Y coordinate, and/or Z a coordinate) that describe the position of each respective tracking device 300, although any coordinate system (e.g., polar coordinates, etc.) that describes the position of each respective tracking device 300 is used in alternative embodiments.

The telemetry data 230 that is received by the array of anchors 120 from the one or more tracking devices 300 includes kinetic telemetry data 234. The kinetic telemetry data 234 provides data related to various kinematics of the respective tracking device. In some embodiments, this kinetic telemetry data 234 is provided as a velocity of the respective tracking device 300, an acceleration of the respective tracking device, and/or a jerk of the respective tracking device. Further, in some embodiments one or more of the above values is determined from an accelerometer (e.g., accelerometer 317 of FIG. 3) of the respective tracking device 300 and/or derived from the positional telemetry data 232 of the respective tracking device. Further, in some embodiments the telemetry data 230 that is received by the array of anchors 120 from the one or more tracking devices 300 includes biometric telemetry data 236. The biometric telemetry data 236 provides biometric information related to each subject associated with the respective tracking device 300. In some embodiments, this biometric information includes a heart rate of the subject, temperature (e.g., a skin temperature, a temporal temperature, etc.), and the like.

In some embodiments, the array of anchors 120 communicates the above described telemetry data (e.g., positional telemetry 232, kinetic telemetry 234, biometric telemetry 236) to a telemetry parsing system 240. Accordingly, in some embodiments the telemetry parsing system 240 communicates the telemetry data (e.g., stream of data 244) to a machine learning engine 210 and/or a real time data packager 246 for further processing and analysis.

In some embodiments, the real time data packager 246 synchronizes one or more data sources (e.g., streaming data 244 from telemetry parsing system 240, game statistics input system 250, machine learning engine 210, etc.) by using one or more timestamps associated with the respective data. For instance, in some embodiments the data sources provide data that is associated with a real world clock timestamp (e.g., an event occurred at and is associated with a real world time of 1:17 P.M.). In some embodiments, the data sources provide data that is associated with a game clock timestamp related to a live sports event (e.g., an event occurred with 2 minutes and 15 seconds remaining in the second quarter). Moreover, in some embodiments the data sources provide data that is associated with both the real world clock timestamp and the game clock timestamp. Synchronization of the data sources via timestamps allows for a designer of the present disclosure to provide services with an additional layer of accuracy, particularly with betting and wagering on outcomes at a live event. For instance, in some embodiments data provided to a user device 700 (e.g., streaming data 280 and/or direct data 282 of FIG. 2B) describes the wagering (e.g., odds) on a next play in a football game. In order to determine if an end user of the user device 700 places a wager within a predetermined window of time (e.g., before the snap of the ball of the next play), the game clock and real world time data received from the user device and/or communicated to the user device are analyzed and the wager is either validated, rejected, or held for further consideration.

In some embodiments, machine learning engine 210 receives data from various sources of the present disclosure in order to predict a future outcome at a live sporting event and generate statistics for analysis and use. For instance, in some embodiments the data sources of the machine learning engine 210 includes a positional data formation classifier 212, hereinafter "neural net," that provides information related to various configurations and formations of players at any given point of time in game. For instance, in some embodiments the formation classifier 212 parses the telemetry data 230 to analyze pre-snap formations of players. The analyses of the pre-snap telemetry data 230 allows for the formation classifier 212 to determine various states and conditions of the game, such as a down of a game, a positional rule violation within a game (e.g., off-sides, illegal motion, etc.), and the like. Moreover, in some embodiments the formation classifier 212 analyzes telemetry data 230 that is received subsequent the start of the play in order to further generate data and information related to how each formation evolves (e.g., an expected running route versus an actual running route, an expected blocking assignment versus an action blocking assignment, a speed of a player throughout a play, a distance between two players throughout a play, etc.).

In some embodiments, machine learning engine 210 includes a historical training data store 214. Historical data store 214 provides historical data and information related to each particular sport (e.g., sports historical data 508 of FIG. 5), each particular team associated with the particular sport (e.g., team historical data 510 of FIG. 5), and/or each particular player associated with the particular sport and/or team (e.g., player historical data 514 of FIG. 5). In some embodiments, this data is initially used as a training data set for the machine learning engine 210. However, the present disclosure is not limited thereto as this data may also be used to further augment the features and services provided by the machine learning engine 210 and other systems of the present disclosure.

Further, in some embodiments the machine learning engine 210 includes a variety of models 220 that are utilized to predict a future outcome of a sporting event and provide analysis of the sporting event. In some embodiments, the models 220 of the machine learning engine 210 include an expected points model 222. The expected points model 222 provides a likelihood of receiving points for a particular play at the event via a numerical value. In some embodiments, the models 220 of the machine learning engine 210 include a win probability model 224 that provides either a likelihood of each participating team of the event to win or a likelihood of any given point spread between the winning and losing teams at the event. Furthermore, in some embodiments the models 220 of the machine learning engine 210 include a player based wins above replacement (WAR) model 226. The WAR model 226 provides a contribution value a respective player adds to their corresponding team (e.g., player 1 provides a value of 1 to a respective team and player two provides a value of 2 to the respective team, therefore player two is worth more to the respective team).

In some embodiments, machine learning engine 210 include a situation store 228. The situation store 228 is a cache of various situational details and/or statistics that is accessed rapidly during a real game scenario. Rapid access to the situation store 228 prevents lag that would otherwise be induced from querying different databases and systems (e.g., positional data formation classifier 212, historical training data 214, etc.) in order to obtain the same information. Additional details and information regarding the machine learning engine and the components therein, including the various above described data stores and models, will be described in more detail infra, with particular reference to at least FIGS. 5 and 6.

Machine learning engine 210 communicates various odds and outputs of the various databases and models therein to an odds management system 600. In communicating with the machine learning engine 210, the odds management system 600 provides various wagers and predictive odds for future events at a sporting event to the user devices 700, while also updating these odds in real time to reflect current situations and statistics of a game.

As depicted in FIG. 2B, in some embodiments system 48 includes a game statistics input system 250. The game statistics input system 250 is configured for providing at least in play data 254, which, in example case of football, describes a state of the game during a given play (e.g., a weak side receiver ran a post route), as well as end of play data 256, which describes a state of the game after a given play (e.g., a play resulted in a first down at the opponents 42-yard line). In some embodiments, the data of the statistics input system 250 is associated with the world and game clock 242, and accordingly is communicated to the telemetry parsing system 240 and/or the machine learning engine 210. In some embodiments the game statistics input system 250 is subsumed by the formation classifier 212.

In some embodiments, various data is communicated to an application programing interface (API) server 260. This data may include streaming data 244, end of play data 256, data from the odds management system 600, or a combination thereof. Accordingly, the API server 260 facilitates communication between various components of the system 48, one or more user devices 700, and a master statistics database 270 in order to provide various features and services of the present disclosure (e.g., a stream of the game, a request for statistics, placing a wager on a play, etc.). Communication between the API server 260 and the one or more user devices 700 includes providing streaming data 280 and/or direct data 282 to each respective user device 700 through the communications network 106, as well as receiving various requests 284 from each respective user device. By way of non-limiting example, streaming data 280 includes tracking "telemetry" data including xyz coordinates of players or accelerometer data of players, direct data 282 includes clock, score, or remaining timeouts.

In some embodiments, the master statistics database 270 includes some or all of the statistics known to the machine learning engine 210 that are obtainable to a user. The master statistics database is updated regularly such as at the end of every play or every few plays. For instance, in some embodiments only a portion of the statistics known to the machine learning engine 210 is desired to be obtainable by a user, and thus is stored in the master statistics database 270. However, the present disclosure is not limited thereto. For instance, in some embodiments the master statistics database 270 is subsumed by the machine learning engine 270. Elements in dashed boxes are optional combined as a single system or device.

Now that an infrastructure of the system 48 has been generally described, an exemplary tracking device 300 will be described with reference to FIG. 3.

Figure 3:
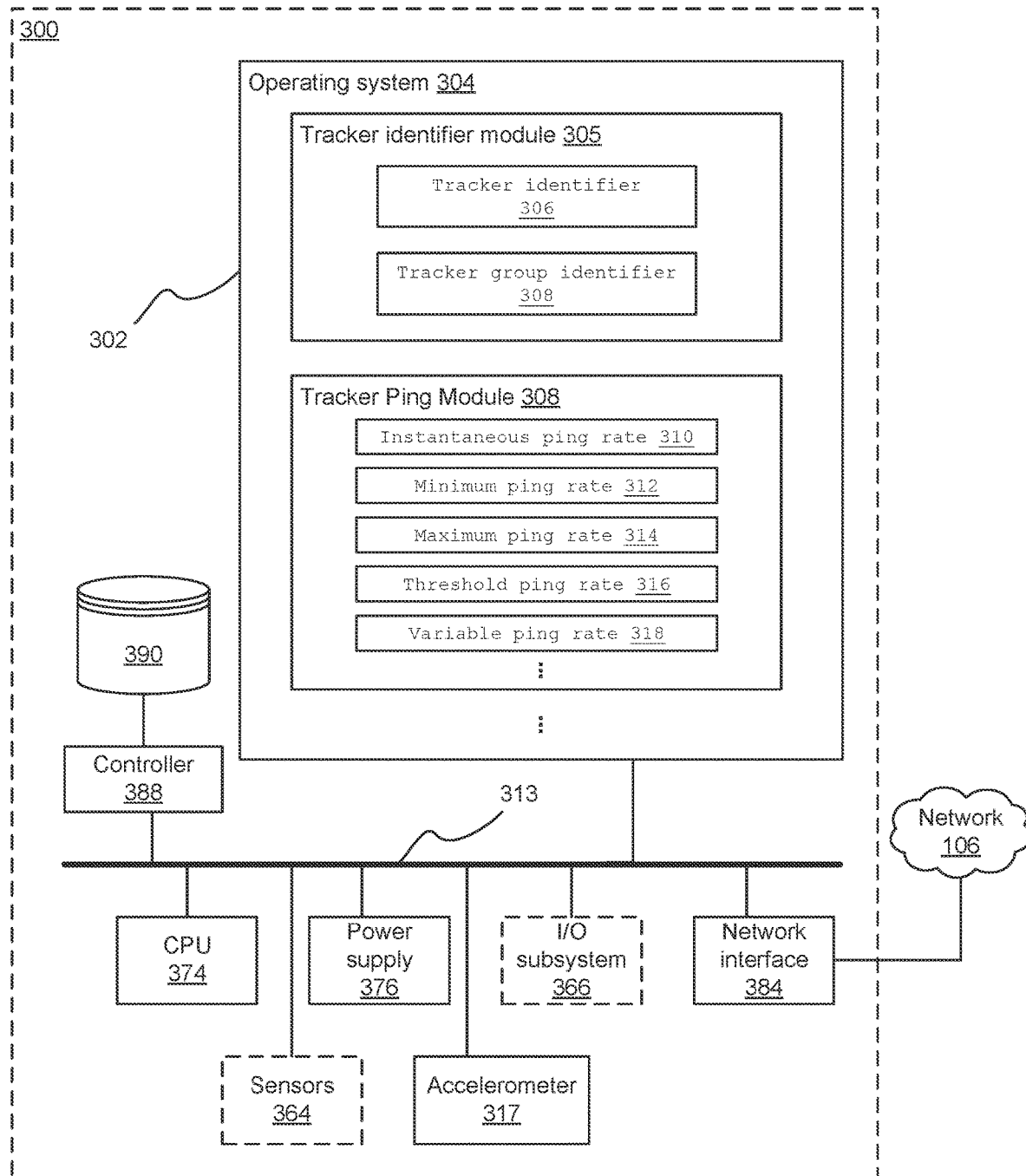
FIG. 3 is a block diagram illustrating an embodiment of a tracking device.

FIG. 3 is a block diagram illustrating an embodiment of a tracking device. In various implementations, the tracking device, hereinafter also a "tracker," includes one or more processing units (CPUs) 374, a memory 302 (e.g., a random access memory), one or more magnetic disk storage and/or persistent device 390 optionally accessed by one or more controllers 388, a network or other communications interface (which may include RF circuitry) 384, an accelerometer 317, one or more optional intensity sensors 364, an optional input/output (I/O) subsystem 366, one or more communication busses 313 for interconnecting the aforementioned components, and a power supply 376 for powering the aforementioned components. In some implementations, data in memory 302 is seamlessly shared with non-volatile memory 390 using known computing techniques such as caching. In some implementations, memory 302 and/or memory 390 may in fact be hosted on computers that are external to the tracking device 300 but that can be electronically accessed by the tracking device 300 over an Internet, intranet, or other form of network or electronic cable (illustrated as element 106 in FIG. 1) using network interface 384.

In various embodiments, the tracking device 300 illustrated in FIG. 3 includes, in addition to accelerometer(s) 317, a magnetometer and/or a GPS (or GLONASS or other global navigation system) receiver for obtaining information concerning a location and/or an orientation (e.g., portrait or landscape) of the tracking device 300.

It should be appreciated that the tracking device 300 illustrated in FIG. 3 is only one example of a device that may be used for obtaining telemetry data (e.g., positional telemetry 232, kinetic telemetry 234, and biometric telemetry 236) of a corresponding subject, and that the tracking device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 302 of the tracking device 300 illustrated in FIG. 3 optionally includes high-speed random access memory and optionally also includes non-volatile memory, such as one or more magnetic disk storage devices, flash memory devices, or other non-volatile solid-state memory devices. Access to memory 302 by other components of the tracking device 300, such as CPU(s) 374 is, optionally, controlled by the memory controller 388.

In some embodiments, the CPU(s) 374 and memory controller 388 are, optionally, implemented on a single chip. In some other embodiments, the CPU(s) 374 and memory controller 388 are implemented on separate chips.

Radio frequency (RF) circuitry of network interface 384 receives and sends RF signals, also called electromagnetic signals. In some embodiments, the RF circuitry 384 converts electrical signals to from electromagnetic signals and communicates with communication networks and other communications devices, such as the one or more anchor devices 120 and/or the tracking device management system 400, via the electromagnetic signals. The RF circuitry 384 optionally includes well-known circuitry for performing these functions, including but not limited to an antenna system, a RF transceiver, one or more amplifiers, a tuner, one or more oscillators, a digital signal processor, a CODEC chipset, a subscriber identity module (SIM) card, memory, and so forth. On some embodiments, the RF circuitry 384 optionally communicates with the communication network 106.

In some embodiments, the network interface (including RF circuitry) 384 operates via ultra-wide band (UWB) technology, which allows for the tracking device 300 to communicate with an array of anchor devices 120 in a crowded spatial region, such as a live sporting event. In some embodiments, the tracking device 300 transmits a low power (e.g., approximately 1 milliwatt (mW)) signal at a predetermined center frequency (e.g., 6.55 GHz 200 mHz, yielding a total frequency range of transmission of approximately about 6.35 GHz to about 6.75 GHz). As used herein, these communications and transmissions are hereinafter referred to as a "ping." For a discussion of UWB, see Jiang et al, 2000, "Ultra-Wide Band technology applications in construction: a review," Organization, Technology and Management in Construction 2(2), 207-213.

In some embodiments, the power supply 358 optionally includes a power management system, one or more power sources (e.g., a battery, a recharging system, a power failure detection circuit, a power converter or inverter, a power status indicator (e.g., a light-emitting diode (LED)) and any other components associated with the generation, management and distribution of power in such tracking devices 300. In some embodiments, the telemetry data 230 includes information related to the power supply 358 of the respective tracking device 300, such as a battery consumption or an expected period of time until the tracking device requires more power.

In some implementations, the memory 302 of the tracking device 300 for tracking a respective subject stores:

an operating system 304 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;

a tracking device identifier module 305 that stores data used to identify the respective tracking device 300 including a tracking device identifier 306 and an optional tracking device group identifier 307; and a tracking device ping module 308 that stores data and information related to a ping rate of the respective tracking device, the tracking device ping module 308 including:

an instantaneous ping rate 310 that describes a current ping rate a respective tracking device 300 is currently operating at, a minimum ping rate 312 that describes a minimum ping rate a respective tracking device 300 may operate at, a maximum ping rate 314 that describes a maximum ping rate a respective tracking device 300 may operate at, a threshold ping rate 316 that describes a minimum ping rate a respective tracking device 300 may operate at, and a variable ping rate flag 318.

The tracking device identifier module 305 stores information that relates to identifying the respective tracking device 300 from a plurality of tracking devices (e.g., tracking device 1 300-1, tracking device 2 300-3, . . . , tracking device P 300-P). In some embodiments, the information stored by the tracking device identifier module 305 includes a tracking device identifier (ID) 306 that includes a unique ID (e.g., a serial number or a code) representing the respective tracking device 300. In some embodiments, the tracking device ID module 305 includes a tracking device group ID 307 that designates the respective tracking device 300 to one or more groups of tracking devices (e.g., tracking device group 418-2 of FIG. 4). Further, in some embodiments pings communicated by the respective tracking device 300 includes data of the tracking device ID module 305, allowing for an array of anchor devices 120 to identify pings received from more than one tracking device. Additional details and information regarding the grouping of a tracking device 300 will be describe in more detail infra, with particular reference to at least FIG. 4.

The tracking device ping module 308 stores data and information related to various ping parameters and conditions of respective tracking device 300, as well as facilitating management of the ping. For instance, in some embodiments the tracking device ping module 308 manages an instantaneous ping rate 310 of the respective tracking device 300 (e.g., managing an instantaneous ping rate 310 to be 10 Hertz (HZ)). In some embodiments, the tracking device 300 is configured with one or more ping rate limits, including one or more both of a minimum ping rate 312 and a maximum ping rate 314, that define a maximum and a minimum ping rate that the tracking device 300 may transmit pings. For instance, in some embodiments the minimum ping rate 312 and/or the maximum ping rate 314 may be set by the tracking device management system 400 based upon one or more of bandwidth limitations, a number of active tracking devices 300, and a type of expected activity (e.g., a sport and/or event types, an expected subject activity, etc.). When configured with one or both ping rate limits, the tracking device ping module 308 operates to adjust the instantaneous ping rate 310 between the minimum ping rate 312 and the maximum ping rate 314. Thus, automatic optimization of tracking management system 400 may be used in combination with automatic ping rate adjustment of tracking device 300. In some embodiments, tracking device ping module 308 is configured to compare detected motion from accelerometer 317 to a predefined threshold 316. Accordingly, the ping module 308 increases the instantaneous ping rate 310 in accordance with a determination that the detected motion is greater than predefined threshold 316 (e.g., until the instantaneous ping rate 310 reaches the maximum ping rate 314). Likewise, the ping module 308 decreases the instantaneous ping rate 310 (e.g., until the instantaneous ping rate 310 reaches the minimum ping rate 312) in accordance with a determination that the detected motion is less than the threshold ping rate 316.

In some embodiments, the ping module 310 includes a variable ping rate flag 318, which is configured (e.g., set wirelessly) by the tracking device management system 400, that determines whether ping module 308 automatically, or not, changes the instantons ping rate 310 based upon determined activity. For example, the tracking device management system 400 may set variable ping rate flag 318 to "false" for one or more tracking devices 300 that is associated with a player not currently participating on the field of play, wherein instantaneous ping rate 310 remains at a low rate even if the player is actively warming up for example. Tracking device management system 400 sets variable ping rate flag 318 to "true" for one or more players that is actively participating on the field of play. Furthermore, in some embodiments each tracking device 300 is dynamically configured based upon a location of the respective tracking device. For instance, in accordance with a determination that a tracking device 300 is within a field of play (e.g., if a player is actively participating in a game) as opposed to a determination that the tracking device is off the field of play (e.g., if a player is not actively participating in a game).

Utilizing the tracking device ping model 308 and/or the sensor (e.g., accelerometer 317 and/or optional sensors 364) within tracking device 300 increases reliability of the system 48 (e.g., the array of anchors 120, the telemetry parsing system 240, the tracking device management system 400, etc.) to track subjects disposed with the tracking device.

As previously described, in some embodiments each tracking device 300 provides telemetry data 230 that is received and communicated by various anchors 120 that are proximate to the respective tracking device 300. This telemetry data includes positional telemetry data 232 (e.g., X, Y, and/or Z coordinates), kinetic telemetry data 234 (e.g., velocity, acceleration, and/or jerk), and/or biometric telemetry data 236 (e.g., heart rate, physical attributes of a player such as shoulder width, etc.).

In some embodiments, each subject in the game is equipped with more than one tracking device 300 in order to increase the accuracy of the data received from the tracking devices about the subject. For instance, in some embodiments the left shoulder and the right shoulder of a respective subject are both equipped with a tracking device 300, each such tracking device functioning normally and having line of site to at least a subset of the anchors 120. Accordingly, in some embodiments the data from the left and right tracking devices 300 have their telemetry data 230 combined to form a single time-stamped object. This single object combines positional data from both tracking devices 300 to create a center line representation of a position of the respective player. Moreover, this center line calculated position provides a more accurate representation of the center of a player's position on the playing field. Further, using the relative positional data from two tracking devices 300 positioned on the left and right shoulders of a player, prior to creating the single player object as described above, allows the system 48 to determine a direction (e.g., a rotation) that the player is facing. In various embodiments, including rotational data greatly eases the task of creating avatars from data created by recording telemetry data 230 during a game and/or establishing sophisticated covariates that can be used to better predict future events in the game or the final outcome of the game itself.

In some embodiments, the tracking device 300 has any or all of the circuitry, hardware components, and software components found in the device depicted in FIG. 3. In the interest of brevity and clarity, only a few of the possible components of the tracking device 300 are shown to better emphasize the additional software modules that are installed on the tracking device 300.

Figure 4:
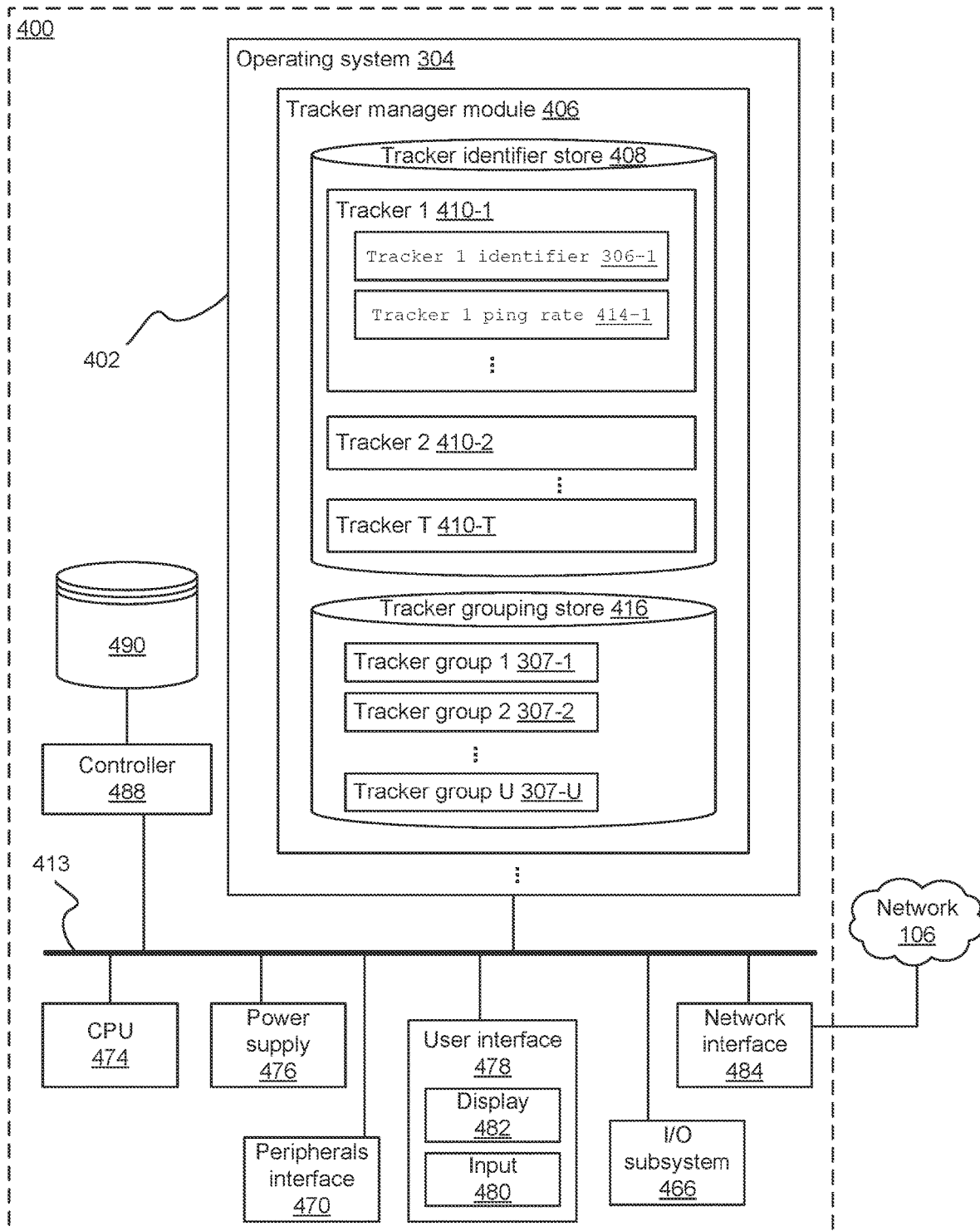
FIG. 4 is a block diagram illustrating an embodiment of a tracking device management system.

FIG. 4 is a block diagram illustrating an embodiment of a tracking device management system. Tracking device management system 400 is associated with one or more tracking devices 300 and anchors 120. The tracking device management system 400 includes one or more processing units (CPUs) 474, a peripherals interface 470, a memory controller 488, a network or other communications interface 484, a memory 402 (e.g., random access memory), a user interface 478, the user interface 478 including a display 482 and an input 480 (e.g., a keyboard, a keypad, a touch screen, etc.), an input/output (I/O) subsystem 466, one or more communication busses 413 for interconnecting the aforementioned components, and a power supply system 476 for powering the aforementioned components.

In some embodiments, the input 480 is a touch-sensitive display, such as a touch-sensitive surface. In some embodiments, the user interface 478 includes one or more soft keyboard embodiments. The soft keyboard embodiments may include standard (QWERTY) and/or non-standard configurations of symbols on the displayed icons.

It should be appreciated that tracking device management system 400 is only one example of a system that may be used in engaging with various tracking devices 300, and that tracking device management system 400 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more magnetic disk storage devices, flash memory devices, or other non-volatile solid-state memory devices. Access to memory 402 by other components of the management system 400, such as CPU(s) 474 is, optionally, controlled by memory controller 488.

Peripherals interface 470 can be used to couple input and output peripherals of the management system to CPU(s) 474 and memory 402. The one or more processors 474 run or execute various software programs and/or sets of instructions stored in memory 402 to perform various functions for the management system 400 and to process data.

In some embodiments, peripherals interface 470, CPU(s) 474, and memory controller 488 are, optionally, implemented on a single chip. In some other embodiments, they are, optionally, implemented on separate chips.

In some embodiments, power system 476 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 4, memory 402 of the tracking device management system preferably stores:

- an operating system 404 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components; and
- a tracking device manager module 406 for facilitating management of one or more tracking devices 300, the tracking device manager module including:
    - a tracking device identifier store 408 for storing pertinent information related to each respective tracking device 410-1 including a tracking device identifier 306 and a tracking device ping rate 414, and
    - a tracking device grouping store 416 for facilitating management of or more tracking device groups 307.

The tracking device identifier store 408 includes information related to each respective tracking device 410-1, including the tracking device identifier (ID) 306 for each respective tracking device 300 as well as a tracking device group 307 to which the respective tracking device is associated. For instance, in some embodiments a first tracking device group 307-1 is associated with the left shoulder of each respective subject and a second tracking device group 307-2 is associated with a right shoulder of each respective subject. Moreover, in some embodiments a third tracking device group 307-3 is associated with a first position (e.g., receiver, defensive end, safety, etc.) of each respective subject and a fourth tracking device group 307-4 is associated with a second position. Grouping 307 of the tracking devices 300 allows for a particular group to be designated with a particular ping rate (e.g., a faster ping rate for running backs). Grouping 307 of the tracking devices 300 also allows for a particular group to be isolated from other tracking devices that are not associated with the respective group, which is useful in viewing representations of the telemetry data 230 provided by the tracking devices of the group. Additional information related to tracking devices and tracking device management systems is found in U.S. Pat. No. 9,950,238, entitled "Object Tracking System Optimization and Tools."

Figure 5:
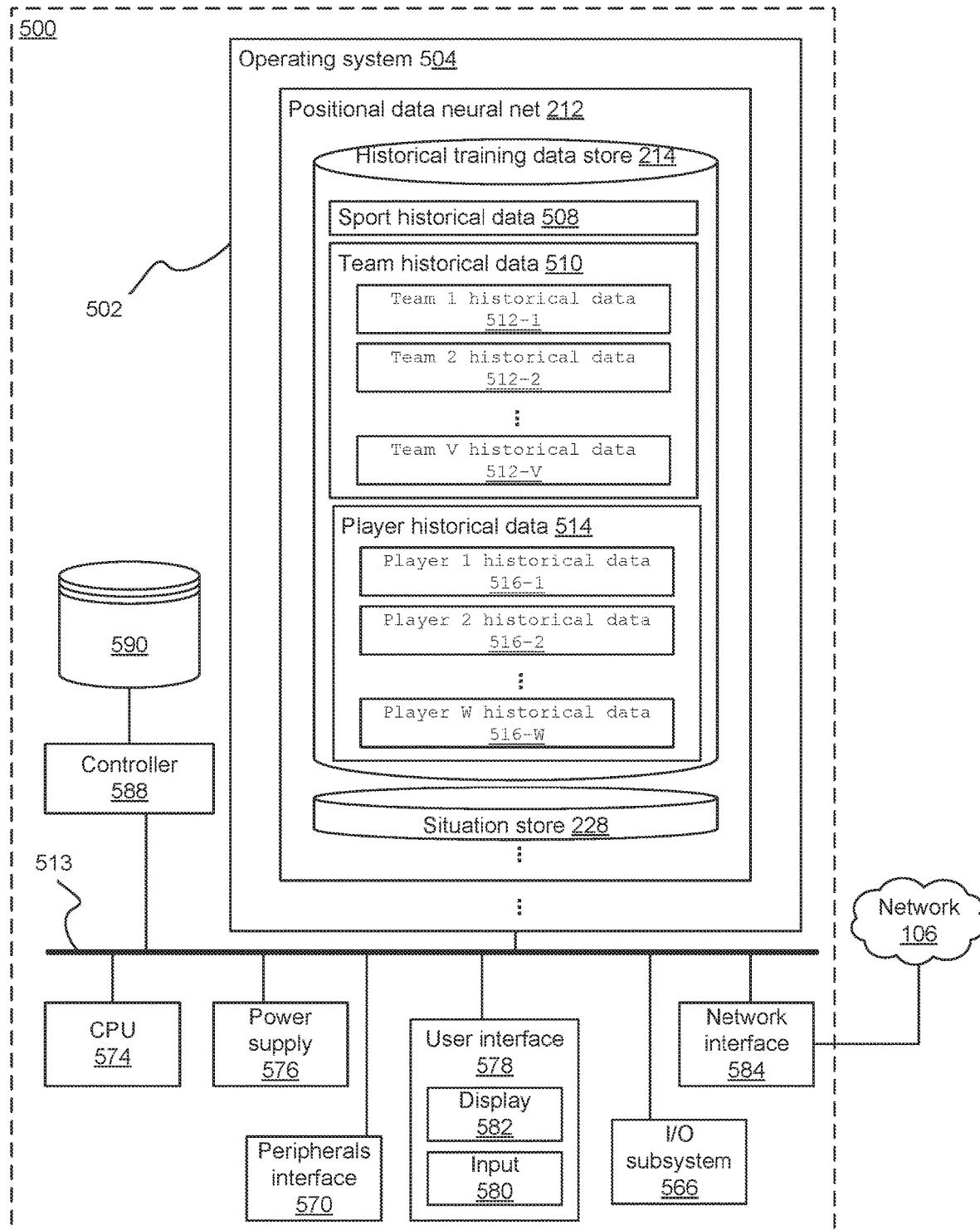
FIG. 5 is a block diagram illustrating an embodiment of a statistics system.

FIG. 5 is a block diagram illustrating an embodiment of a statistics system. Statistics system 500 stores and determines various statistics in accordance with the present disclosure. The statistics system 500 includes one or more processing units (CPUs) 574, peripherals interface 570, memory controller 588, a network or other communications interface 584, a memory 502 (e.g., random access memory), a user interface 578, the user interface 578 including a display 582 and an input 580 (e.g., a keyboard, a keypad, a touch screen, etc.), input/output (I/O) subsystem 566, one or more communication busses 513 for interconnecting the aforementioned components, and a power supply system 576 for powering the aforementioned components.

In some embodiments, the input 580 is a touch-sensitive display, such as a touch-sensitive surface. In some embodiments, the user interface 578 includes one or more soft keyboard embodiments. The soft keyboard embodiments may include standard (e.g., QWERTY) and/or non-standard configurations of symbols on the displayed icons.

It should be appreciated that statistics system 500 is only one example of a system that may be used in staring and determining various statistics, and that statistics system 500 optionally has more or fewer components than shown, optionally combines two or more components, or optionally has a different configuration or arrangement of the components. The various components shown in FIG. 5 are implemented in hardware, software, firmware, or a combination thereof, including one or more signal processing and/or application specific integrated circuits.

Memory 502 optionally includes high-speed random access memory and optionally also includes non-volatile memory, such as one or more magnetic disk storage devices, flash memory devices, or other non-volatile solid-state memory devices. Access to memory 502 by other components of the statistics system 500, such as CPU(s) 574 is, optionally, controlled by memory controller 588.

Peripherals interface 570 can be used to couple input and output peripherals of the management system to CPU(s) 574 and memory 502. The one or more processors 574 run or execute various software programs and/or sets of instructions stored in memory 502 to perform various functions for the statistics system 500 and to process data.

In some embodiments, peripherals interface 570, CPU(s) 574, and memory controller 588 are, optionally, implemented on a single chip. In some other embodiments, they are, optionally, implemented on separate chips.

In some embodiments, power system 576 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 5, memory 502 of the remote user device preferably stores:

- an operating system 504 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
- a positional formation classifier 212 for determining and analyzing formations of players;
- a historical training data store 214 for storing various statistics related to each sport 508, wherein each sport 508 including various team historical data 510 for one or more teams 512, as well as various player statistics 514 for one or more players 516; and
- a situational store 228 for storing data related to formations of players and game situations.

The positional formation classifier 212 (sometimes simply called a formation classifier) provides information related to various states and formations of players at any given point of time in game. For instance, in some embodiments the formation classifier 212 parses telemetry data 230 in order to determine pre-snap formations. Accordingly, once a formation is determined and telemetry data 230 is parsed, sub-categories of the formation may be determined (e.g., an I-formation with different sub-categories defining different running backs). Moreover, in some embodiments the formation classifier 212 acts as a virtual referee and determines if infractions have occurred within a game or play, such as a player being off-sides, a neutral zone infraction, an illegal motion, an illegal formation, and the like. In some embodiments, the formation classifier 212 includes one or more tables of various formations in a football game, such as a first table of offensive formations, a second table of defensive formations, and a third table of special teams formations. In some embodiments, the above table of formations provides some or all of the formations described by Table 1, Table 2, and Table 3.

TABLE 1

Exemplary Offensive Football Formations
Exemplary Formation

Double wing formation
Empty backfield formation
Goal line formation
I formation
Pistol formation
Pro set formation
Short punt formation
Shotgun formation
Exemplary Formation
Single set back formation
Single wing formation
T formation
Tackle spread formation
V formation
Victory formation
Wing T formation
Wishbone formation

TABLE 2

Exemplary Defensive Football Formations
Exemplary Formation 38 formation
46 formation
2-5 formation
3-4 formation
4-3 formation
4-4 formation
5-2 formation
5-3 formation
6-1 formation
6-2 formation
Seven-man line formation
Nickle formation
Dime formation
Quarter formation
Half dollar formation

TABLE 3

Exemplary Special Teams Football Formations
Exemplary Formation

Field goal formation
Kick return formation
Kickoff formation
Punt formation

Additionally, in some embodiments the formation classifier 212 determines a ball carrier by comparing telemetry data 230 provided by the ball and telemetry data of a player that is closest to the ball. Likewise, in some embodiments determining which team has possession of the ball is conducted in a similar manner. Furthermore, in some embodiments the formation classifier 212 determines if a player is within a boundary of a game by analyses the telemetry data 230 extracted from the player and comparing this with the known boundaries of the field of play. In this way, the formation classifier 212 parses telemetry data 230 to provide a box score and/or automatic color commentary of a game.

While the formation classifier 212 is labeled a "neural net" it will be appreciated that the formation classifier 212 module does not have to perform classification of team formation using a neural network classifier. In some embodiments the formation classifier 212 module does in fact make use of any classification scheme that can discern a team formation from telemetry data. For instance, in some embodiments formation classifier 212 makes use of a nearest neighbor algorithm to perform the classification of team formation. In other embodiments formation classifier 212 makes use of clustering to perform the classification of team formation. In some embodiments the elucidation of the formation class by formation classifier 212 is used as a covariate in statistical models that predict the outcome of a current live game (e.g., win/loss, point spread, etc.) as disclosed with respect to methods and features described with respect to FIG. 8.

In more detail, in some embodiments, the formation classifier 212 is based on a logistic regression algorithm, a neural network algorithm, a support vector machine (SVM) algorithm, a Naive Bayes algorithm, a nearest-neighbor algorithm, a boosted trees algorithm, a random forest algorithm, or a decision tree algorithm.

By way of non-limiting example the formation classifier 212 is based on a logistic regression algorithm, a neural network algorithm, a support vector machine (SVM) algorithm, a Naive Bayes algorithm, a nearest-neighbor algorithm, a boosted trees algorithm, a random forest algorithm, or a decision tree algorithm. When used for classification, SVMs separate a given set of binary labeled data training set with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space corresponds to a non-linear decision boundary in the input space. Tree-based methods partition the feature space into a set of rectangles, and then fit a model (like a constant) in each one. In some embodiments, the decision tree is random forest regression. One specific algorithm that can serve as the formation classifier 212 for the instant methods is a classification and regression tree (CART). Other specific decision tree algorithms that can serve as the formation classifier 212 for the instant methods include, but are not limited to, ID3, C4.5, MART, and Random Forests.

In some embodiments, the historical data store 214 stores statistics related to each sport 508, each team 510 within the sport league, as well as the respective players 512. As previously described, in some embodiments the data stored in the historical data store 214 is utilized as a training set of data for machine learning engine 210 and/or formation classifier 212. For instance, in some embodiments the data stored in the historical data store 214 is utilized as an initial data set at a start of a league, as in inferred from other data sets of similar league (e.g., using college football stats if a player is a professional rookie), or utilized to create data points if a new statistic is being generated (e.g., a previously unknown statistic becomes relevant). Furthermore, in some embodiments data from a previously played game is stored within the historical data store 214.

In some embodiments, the situation store 228 includes data stored in one or more databases of the machine learning engine 210 as a cache of information. This cache of the situation store 228 allows for data to be queried for and utilized rapidly, rather than having to query each respective database. In some embodiments, the situation store 288 creates a new cache of data for each respective game. However, the present disclosure is not limited thereto.

Figure 6:
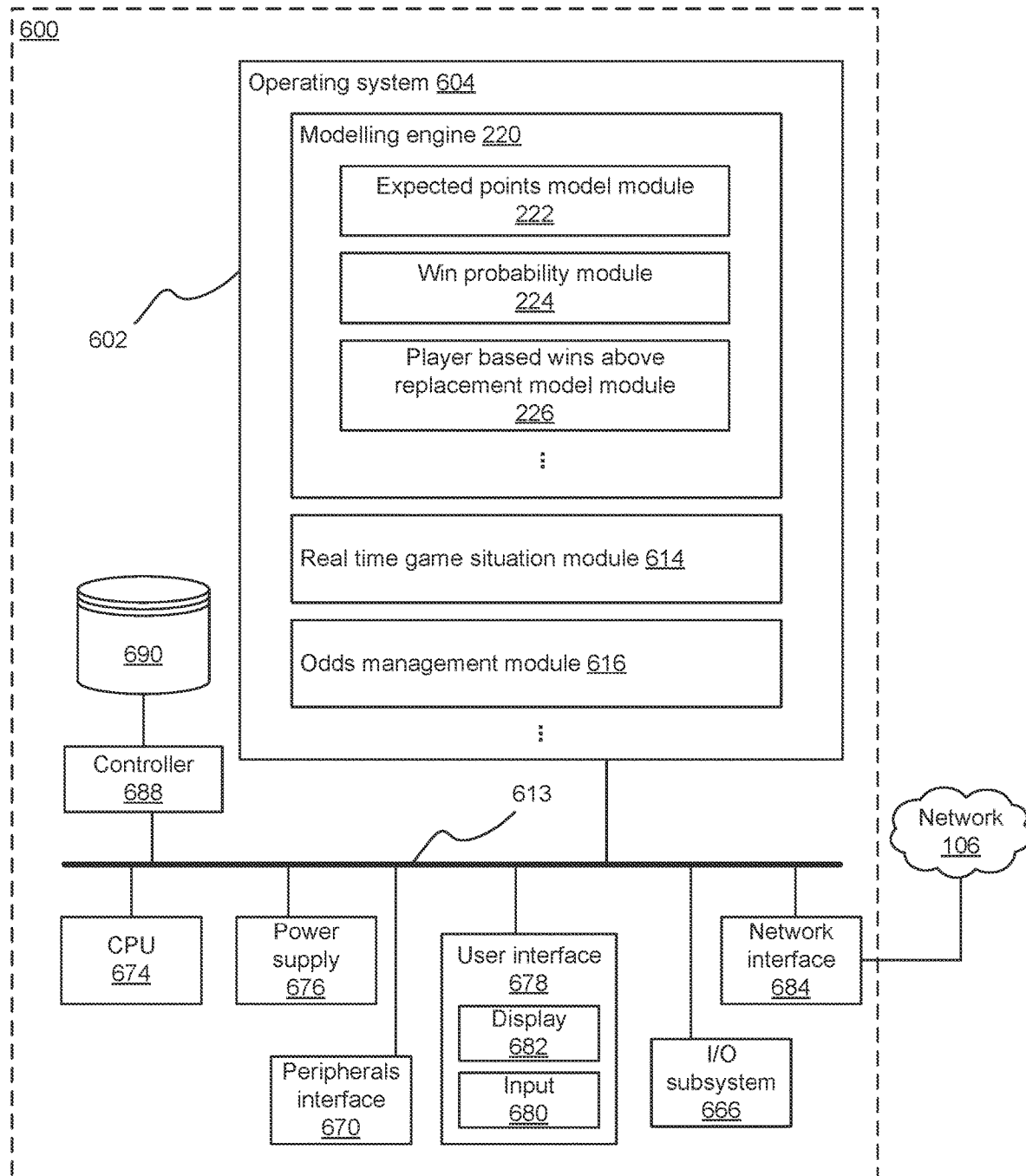
FIG. 6 is a block diagram illustrating an embodiment of an odds management system.

FIG. 6 is a block diagram illustrating an embodiment of an odds management system. Odds management system 600 stores and determines various odds in accordance with the present disclosure. The odds management system 600 includes one or more processing units (CPUs) 674, peripherals interface 670, memory controller 688, a network or other communications interface 684, a memory 602 (e.g., random access memory), a user interface 678, the user interface 678 including a display 682 and an input 680 (e.g., a keyboard, a keypad, a touch screen, etc.), input/output (I/O) subsystem 666, one or more communication busses 613 for interconnecting the aforementioned components, and a power supply system 676 for powering the aforementioned components.

In some embodiments, the input 680 is a touch-sensitive display, such as a touch-sensitive surface. In some embodiments, the user interface 778 includes one or more soft keyboard embodiments. The soft keyboard embodiments may include standard (QWERTY) and/or non-standard configurations of symbols on the displayed icons.

It should be appreciated that odds management system 600 is only one example of a system that may be used in staring and determining various statistics, and that the odds management system 600 optionally has more or fewer components than shown, optionally combines two or more components, or optionally has a different configuration or arrangement of the components. The various components shown in FIG. 6 are implemented in hardware, software, firmware, or a combination thereof, including one or more signal processing and/or application specific integrated circuits.

Memory 602 optionally includes high-speed random access memory and optionally also includes non-volatile memory, such as one or more magnetic disk storage devices, flash memory devices, or other non-volatile solid-state memory devices. Access to memory 602 by other components of the odds management system 600, such as CPU(s) 674 is, optionally, controlled by memory controller 688.

Peripherals interface 670 can be used to couple input and output peripherals of the management system to CPU(s) 674 and memory 602. The one or more processors 674 run or execute various software programs and/or sets of instructions stored in memory 602 to perform various functions for the odds management system 600 and to process data.

In some embodiments, peripherals interface 670, CPU(s) 674, and memory controller 688 are, optionally, implemented on a single chip. In some other embodiments, they are, optionally, implemented on separate chips.

In some embodiments, power system 676 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 6, memory 602 of the remote user device preferably stores:
an operating system 604 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;
a modelling engine 200 for storing one or more prediction or outcome models, the modelling engine including:
an expected points model module 222 for determining an expected points value of a scenario in a game,
a win probability model 224 for determining a probably of winning a game, and
a player based wins above replacement model module 226 for determining;
a real time game situation module 614 for receiving and communicating information related to a game currently being conducted; and
an odds management module 616 for facilitation management of various odds and betting systems.

As previously described, the modelling engine 200 includes various algorithms and models utilized for generating statistics and predicting outcomes at a sports event. In some embodiments, these models include the expected points model 222 that provides a numerical value for each play of a game. For instance, if a drive in a game that results in a touchdown has plays that include a 5-yard rush, a 94-yard pass, and a 1-yard rush, even though the 1-yard rush resulted in the touchdown the 94-yard pass has a much more significant role in the drive. Thus, in some embodiments the 5-yard rush is allocated an expected points value of 0.5, the 94-yard pass is allocated an expected points value of 5.5, and the 1-yard rush is allocated an expected points value of 1, with high values indicating more important or game defining plays. In some embodiments modelling engine 200 uses the telemetry data collected in accordance with the present disclosure to predict the outcome of a game (e.g., win/loss, point spread, etc.) as disclosed with respect to methods and features described with respect to FIG. 8.

In some embodiments, the real time game situation module 614 receives information related to situations occurring in a game. This information is then utilized in adjusting various weights and values in the above described models. For instance, if a quarterback rolls his ankle and has to take every play from a shotgun position, this immobility of the quarterback will be reflected in the game models 220 through the real time game situation module 614.

Figure 7:
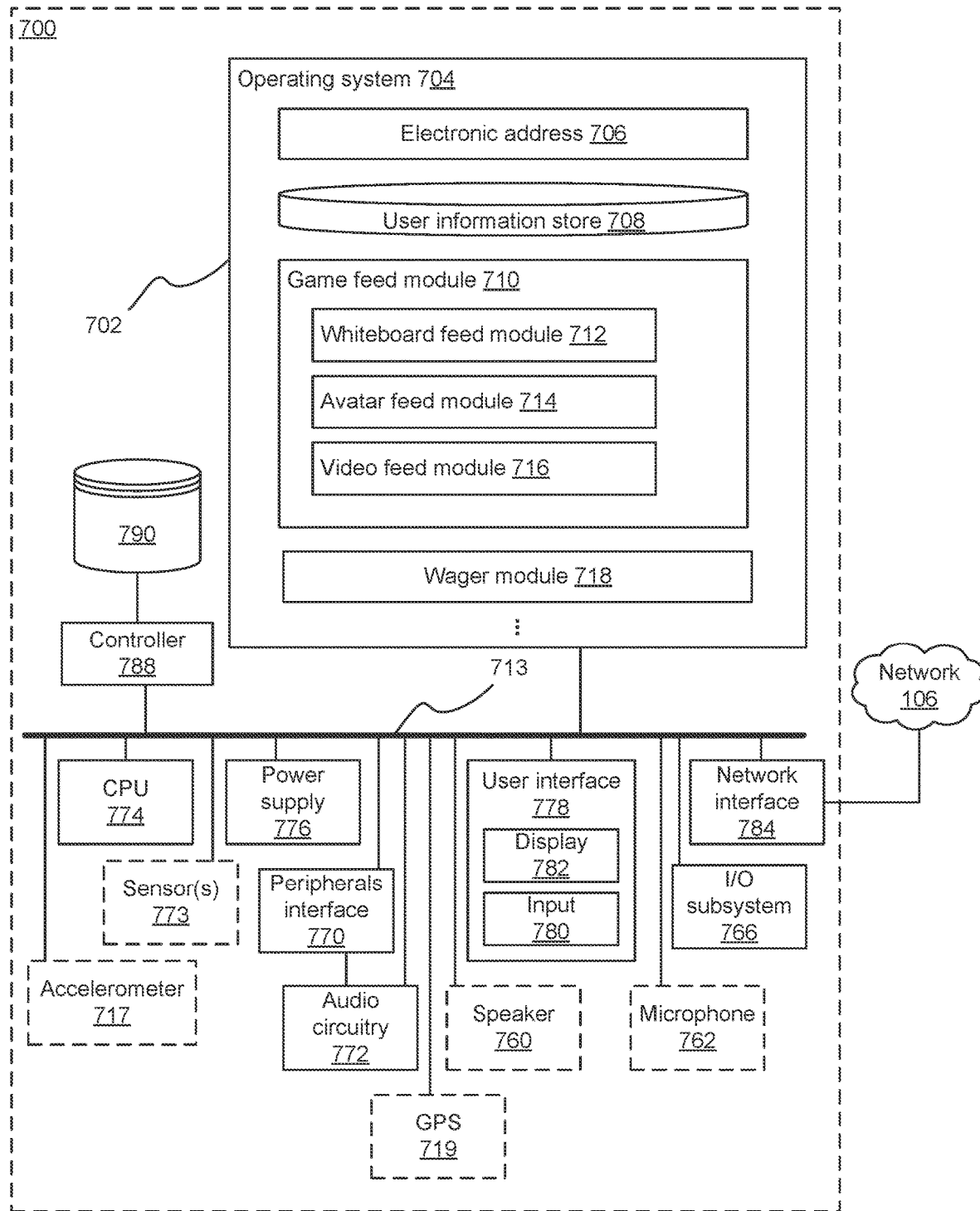
FIG. 7 is a block diagram illustrating an embodiment of a user device.

FIG. 7 is a block diagram illustrating an embodiment of a user device. User device is a remote user device 700 associated with an end user in accordance with the present disclosure. The user device 700 includes one or more processing units (CPUs) 774, peripherals interface 770, memory controller 788, a network or other communications interface 784, a memory 702 (e.g., random access memory), a user interface 778, the user interface 778 including a display 782 and an input 780 (e.g., a keyboard, a keypad, a touch screen, etc.), input/output (I/O) subsystem 766, an optional accelerometer 717, an optional GPS 719, optional audio circuitry 772, an optional speaker 760, an optional microphone 762, one or more optional sensors 764 such as for detecting intensity of contacts on the user device 700 (e.g., a touch-sensitive surface such as a touch-sensitive display system of the device 700) and/or an optical sensor, one or more communication busses 713 for interconnecting the aforementioned components, and a power supply system 776 for powering the aforementioned components.

In some embodiments, the input 780 is a touch-sensitive display, such as a touch-sensitive surface. In some embodiments, the user interface 778 includes one or more soft keyboard embodiments. The soft keyboard embodiments may include standard (QWERTY) and/or non-standard configurations of symbols on the displayed icons.

It should be appreciated that the user device 700 is only one example of a device of a multifunction device that may be used by end users, and that the user device 700 optionally has more or fewer components than shown, optionally combines two or more components, or optionally has a different configuration or arrangement of the components. The various components shown in FIG. 7 are implemented in hardware, software, firmware, or a combination thereof, including one or more signal processing and/or application specific integrated circuits.

Memory 702 optionally includes high-speed random access memory and optionally also includes non-volatile memory, such as one or more magnetic disk storage devices, flash memory devices, or other non-volatile solid-state memory devices. Access to memory 702 by other components of the user device 700, such as CPU(s) 774 is, optionally, controlled by memory controller 788.

Peripherals interface 770 can be used to couple input and output peripherals of the management system to CPU(s) 774 and memory 702. The one or more processors 774 run or execute various software programs and/or sets of instructions stored in memory 702 to perform various functions for the user device 700 and to process data.

In some embodiments, peripherals interface 770, CPU(s) 774, and memory controller 788 are, optionally, implemented on a single chip. In some other embodiments, they are, optionally, implemented on separate chips.

In some embodiments, audio circuitry 772, speaker 760, and microphone 762 provide an audio interface between a user and the device 700. The audio circuitry 772 receives audio data from peripherals interface 770, converts the audio data to an electrical signal, and transmits the electrical signal to speaker 760. Speaker 760 converts the electrical signal to human-audible sound waves. Audio circuitry 772 also receives electrical signals converted by microphone 762 from sound waves. Audio circuitry 772 converts the electrical signal to audio data and transmits the audio data to peripherals interface 770 for processing. Audio data is, optionally, retrieved from and/or transmitted to memory 702 and/or RF circuitry 784 by peripherals interface 770.

In some embodiments, power system 776 optionally includes a power management system, one or more power sources (e.g., battery, alternating current (AC)), a recharging system, a power failure detection circuit, a power converter or inverter, a power status indicator (e.g., a light-emitting diode (LED), etc.) and any other components associated with the generation, management and distribution of power in portable devices.

As illustrated in FIG. 7, memory 702 of the remote user device preferably stores:

an operating system 704 (e.g., ANDROID, iOS, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components;

an electronic address 706 that is used to identify a particular user device during communications with various systems and devices of the present disclosure;

a user information store 708 that stores pertaining information related to the respective user associated with the corresponding user device 700, such as user access information including usernames, user passwords, access tokens, etc.;

a game feed module 710 for viewing various representations of a game including a whiteboard feed module 712, an avatar feed module 714, and a video feed module 716 as well as viewing various statistics related to the game; and a wager module 718 that facilitates placing wagers on game scenarios.

Figure 8:
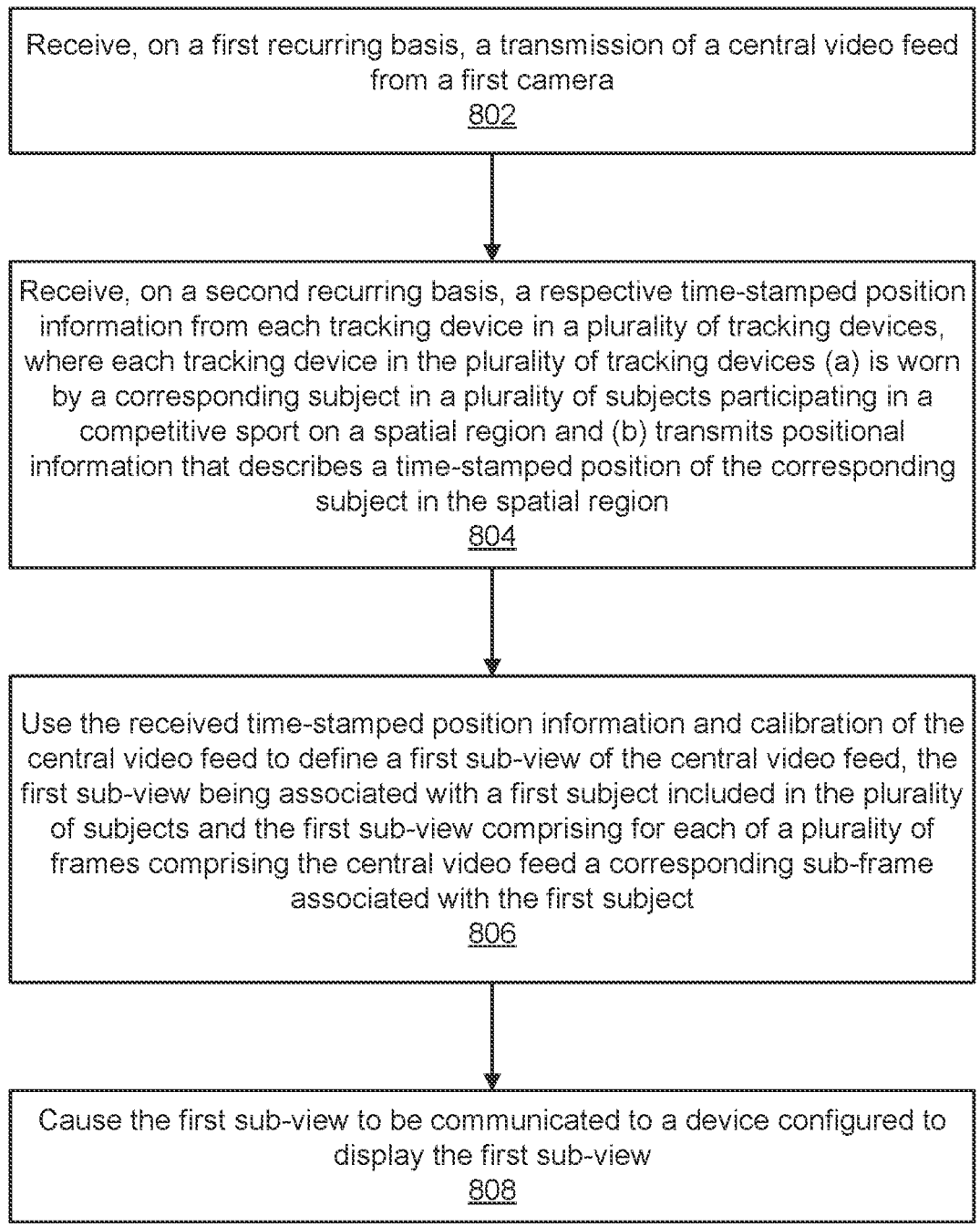
FIG. 8 is a flow chart illustrating an embodiment of a process to partitioning a video feed to segment live player activity.

In some embodiments wager module 718 uses the telemetry data collected in accordance with the present disclosure to predict the outcome of a current game using extended covariants (e.g., win/loss, point spread, etc.), as disclosed with respect to methods and features described with respect to FIG. 8. In some embodiments, wager module 718 uses the telemetry data collected in accordance with the present disclosure to provide odds for future game events in a current live game.

Now that a general topology of the system 48 has been described, methods for partitioning a video feed to segment live player activity will be described with reference to, at least, FIGS. 1 through 7.

FIG. 8 is a flow chart illustrating an embodiment of a process partition a video feed to segment live player activity. This process may be implemented by processor 100 in cooperation with user device 700 and the other devices of system 48 described above.

Figure 10A:
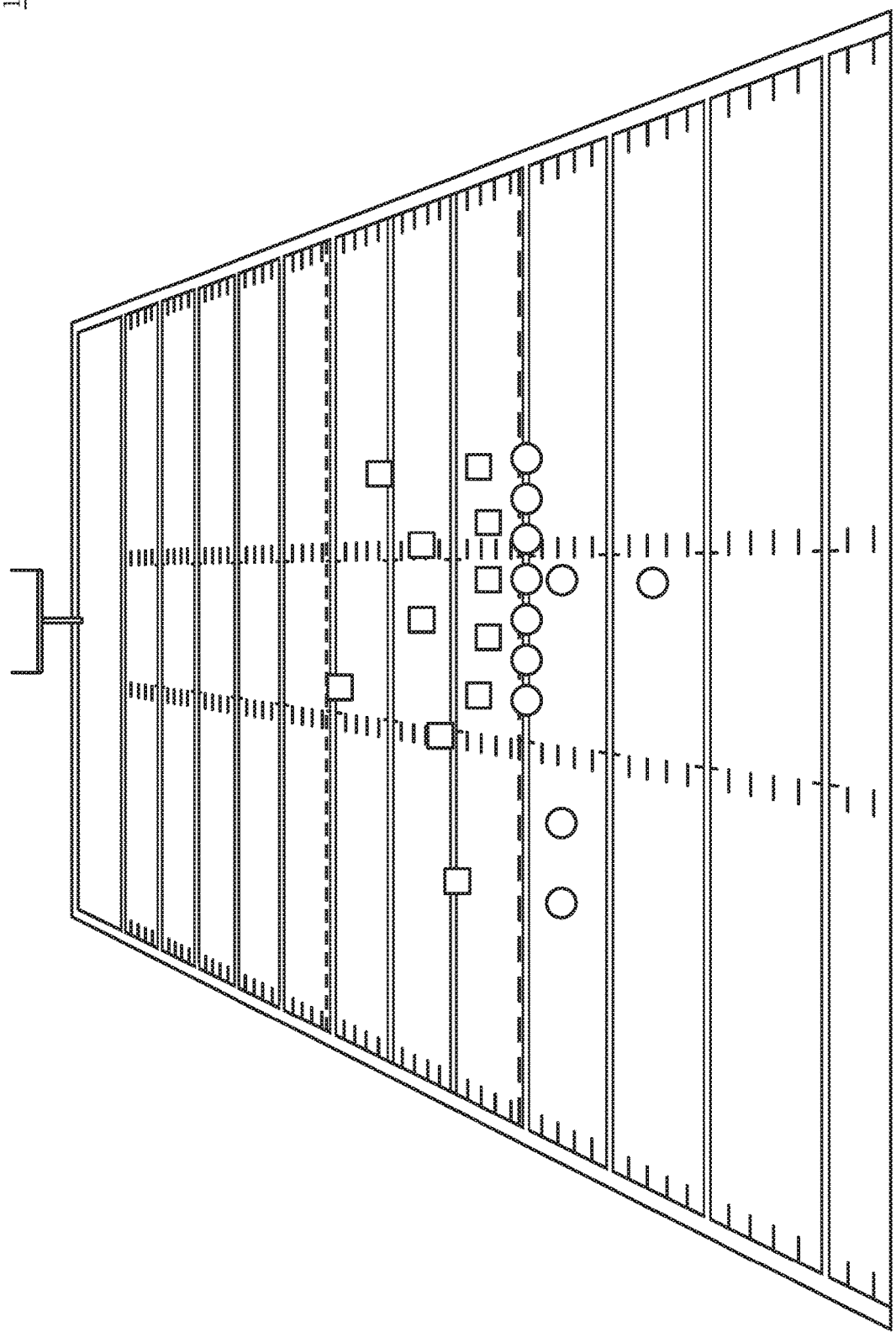
FIG. 10A shows an example of a central video feed according to an embodiment of the present disclosure.

At 802, process 800 receives, on a first recurring basis, a transmission of a central video feed from a first camera. Referring to FIG. 10A, a central video feed 1000-A is received from a first camera 140, for example. In some embodiments, the camera 140 is a fixed camera (e.g., the camera is limited in movement in at least one axis). For instance, in some embodiments the camera 140 is fixed such that the camera is capable of having a variable tilt, pan, and/or zoom, but is not able to be physically moved to another location. The camera can be disposed in a variety of locations and orientations such as at a first end portion (e.g., a half court line, a 50-yard line) of a field of play in a landscape orientation or at a second end portion (e.g., an end zone, a goal) of a field of in a portrait orientation, among others. The camera 140 is in communication with a network (e.g., communications network 106) in order to communicate with one or more devices and systems of the present disclosure.

In some embodiments, the central video feed comprises and/or is included in a plurality of central or other video fees, each generated by one or more cameras located and oriented to generate video of at least a portion of the field of play. In some embodiments, the central video feed and/or another video feed may be generated at least in part by combining video data generated by a plurality of cameras, such as a composite or otherwise merged or combined video.

The central video feed is calibrated against a spatial region represented in at least two dimensions that is encompassed by the central video feed. In some embodiments, the spatial region is a region that is captured by an array of anchor devices 120. The spatial region can be a field of play of a live sports event (e.g., field of play 902 of FIG. 9).

In some embodiments, the calibration of the central video feed includes determining an equivalent portion of the central video feed for the coordinate system used by the positional information (e.g., telemetry data 230). Since standard fields of play of competitive sports include boundary lines of regulation, uniform length and thickness/widths (e.g., an out of bounds line, a half court line, a yard line, etc.), these lengths and thicknesses can be used to determine coordinate positions in the video feed. For instance, if a line on a field of play is known to have a uniform thickness (e.g., 6 centimeters thickness) and the thickness of the line in the central video seen is determined to reduce linearly from a first thickness to a second thickness, then an exact location of a subject with respect to the line can be determined in the central video feed.

At 804, the process receives, on a second recurring basis, a respective time-stamped position information from each tracking device in a plurality of tracking devices, where each tracking device in the plurality of tracking devices (a) is worn by a corresponding subject in a plurality of subjects participating in a competition on the spatial region and (b) transmits positional information that describes a time-stamped position of the corresponding subject in the spatial region.

A respective transmission of time-stamped positional information (e.g., telemetry data 230) is received from each tracking device 300 in a plurality of tracking devices. The recurring basis of receiving the transmission of time-stamped positional information can be a ping rate (e.g., instantaneous ping rate 310 of FIG. 3) of a respective tracking device 300. In some embodiments, transmission of time-stamped positional information from each tracking device in a plurality of tracking devices occurs at a bandwidth of greater than 500 MHz or a fractional bandwidth equal to or greater than 0.20. By way of non-limiting example, the transmission of time-stamped positional information from each tracking device in a plurality of tracking devices is within 3.4 GHz to 10.6 GHz, each tracking device 300 in the plurality of tracking devices has a signal refresh rate of between 1 Hz and 60 Hz, and/or the recurring basis is between 1 Hz and 60 Hz. Each tracking device 300 of the plurality of tracking devices sends a unique signal that is received by the receiving, identifying a respective tracking device. Each tracking device can transmit biometric data (e.g., biometric telemetry 236) specific to a respective subject associated with the respective tracking device if biometric data is collected.

Each tracking device 300 is worn by a corresponding subject in a plurality of subjects that is participating in a competition on the spatial region. Further, each tracking device 300 transmits positional information (e.g., telemetry data 230) that describes a time-stamped position of the corresponding subject in the spatial region. In some embodiments, there are at least two tracking devices 300 worn by each subject in the plurality of subjects. Each additional tracking device 300 associated with a corresponding subject reduces an amount of error in predicting an actual location of the subject.

In some embodiments, the plurality of subjects includes a first team (e.g., a home team) and a second team (e.g., an away team). In some embodiments, the first team and/or the second are included in a league of teams (e.g., a football league, a basketball association, etc.). The first team includes a first plurality of players (e.g. a first roster of players) and the second team includes a second plurality of players (e.g., a second roster of players). Throughout various embodiments of the present disclosure, the first team and the second team are engaged in a competitive game (e.g., a live sport event), such as a football game or a basketball game. Accordingly, the spatial region is a field of play of the competitive game, such as a football field or a basketball court. In some embodiments, the subjects of the present disclosure are players, coaches, referees, or a combination thereof that are associated with a present game.

In some embodiments, each time-stamped position in an independent plurality of time-stamped positions for a respective player of the first or second plurality of players includes an xyz-coordinate of the respective player with respect to the spatial region. For instance, in some embodiments the spatial region is mapped such that a center portion of the spatial region (e.g., half court, 50-yard line, etc.) is an origin of an axis and a boundary region of the spatial region (e.g., an out of bounds line) is a maximum or minimum coordinate of an axis. In some embodiments, the xyz-coordinate has an accuracy of ±5 centimeters, ±7.5 centimeters, ±10 centimeters, ±12.5 centimeters, ±15 centimeters, or ±17.5 centimeters.

At 806, the process uses the received time-stamped position information and the calibration of the central video feed to define a first sub-view of the central video feed. The first sub-view is associated with a first subject included in the plurality of subjects and the first sub-view comprising for each of a plurality of frames comprising the central video feed a corresponding sub-frame associated with the first subject.

For example, in some embodiments, at 806 the process applies to each of a plurality of sequential frames of video data a mathematical transformation that is based at least in part on corresponding camera/video calibration data to determine, based on timestamp data comprising the received positional information and the positional information associated with each timestamp (e.g., XYZ coordinates of a subject A), a subset or portion of each sequential frame that is associated with the corresponding positional information of the subject A. The determined subsets/portions of the sequential frames are used to provide a sub-view of the central video feed associated with the subject A.

The sub-view is a different resolution from the central video feed in various embodiments. Despite being a different resolution, the quality difference is not necessarily noticeable to the average spectator so that the viewing experience remains enjoyable. For example, the central video feed is provided at a first resolution (e.g., a native resolution of the camera 140) such as between 2K and 8K. To this point, in some embodiments the central video feed includes a plurality of full two-dimensional frames (e.g., a first frame associated with a first time point, a second frame associated with a second time point, . . . , a nth frame associated with an nth time point). Each respective full two-dimensional frame in the plurality of full two-dimensional frames has a first dimension size and a second dimension size (e.g., a horizontal size and a vertical size such as a number of horizontal pixels and a number of vertical pixels). The first sub-view includes a corresponding sub-frame, for each respective full two-dimensional frame in the plurality of full two-dimensional frames. Each corresponding sub-frame is a portion of a corresponding full frame (e.g., sub-view 1000-B and sub-view 1000-C of FIGS. 10B and 10C, respectively, illustrate instantaneous sub-frames of the central video feed full frame 1000-A of FIG. 10A).

In some embodiments, each sub-frame has a third dimension size and a fourth dimension size. Moreover, the third dimension size can be a fixed fraction of the first dimension size and the fourth dimension size is a fixed fraction of the second dimension size. For instance, the fixed fraction of the first dimension size and the fixed fraction of the second dimension size of a same fraction (e.g., 10%, 20%, 30%, . . . , 90%). Similarly, the fixed fraction of the first dimension size can be a first fraction and the fixed fraction of the second dimension size can be a second fraction different than the first fraction (e.g., the central video feed is captured in a landscape orientation and each sub-view is partitioned in a portrait orientation). By way of non-limiting example, (i) the first dimension size is 7680 pixels and the third dimension size is 3840 pixels, and the second dimension size is 4320 pixels and the fourth dimension size is 2160 pixels; or (ii) the first dimension size is 8192 pixels and the third dimension size is 3840 pixels, and the second dimension size is 4320 pixels and the fourth dimension size is 2160 pixels. In some embodiments each respective full two-dimensional frame in the plurality of full two-dimensional frames includes at least 10 megapixels to 40 megapixels (e.g., 10 megapixels, 15 megapixels, 20 megapixels, . . . , 40 megapixels).

In some embodiments a sub-view (e.g., the first sub-view) includes a corresponding sub-frame, for each respective full two-dimensional frame in the plurality of full two-dimensional frames, that includes less than 5 megapixels to 15 megapixels (e.g., 5 megapixels, 7.5 megapixels, 10 megapixels, . . . , 15 megapixels).

The time-stamped positional information of the receiving is overlaid onto the central video feed. This overlaying is conducted using the calibration of the central video feed against the spatial region. For instance, if the central video feed is calibrated against the spatial region using the same coordinate system as the positional information, then the received positional information can be mapped onto the central video feed using the same coordinate system. This overlaying determines a location of each subject in at least a subset of the plurality of subjects in the central video feed. For instance, in some embodiments the positional information 230 provides at least an X and Y coordinate of a subject on the spatial region (e.g., field of play 902 of FIG. 9) at a respective time stamp. Since the central video feed has been calibrated using the same coordinate system as the positional information, the X and Y coordinate of the subject can be equated to a location in the video feed. This allows for the subject to be tracked in the central video feed using positional information, instead of tracking the subject using optical characteristics of the subject (e.g., a color of the subject, a silhouette of the subject, etc.).

In some embodiments, the time-stamped positional information includes a world clock time-stamp, a game clock time-stamp, or a combination thereof (e.g., world and game clocks 242 of FIG. 2). The one or more time stamps is used by the overlapping to overlap the time-stamped positional information of the receiving of positional information onto the central video feed. For instance, if the time stamped positional information consumes a first period of time until received by the system 48 and the central video feed consumes a second period of time until received by the system, the time stamps associated with the central video feed and the positional information are compared in order to ensure that the overlaying is accurate and precise.

At 808, the process causes the first sub-view to be communicated to a device configured to display the first sub-view. As described above, a first sub-view (e.g., sub-view 1000-B of FIG. 10B) of the central video feed can be defined at a second resolution, that is less than the first resolution. For instance, the first resolution is at least four times, six times, or eight times the pixel resolution of a second resolution of a video that is partitioned from the central video feed.

The coordinates of a center of the first sub-view within the central video feed changes over time, without human intervention, in accordance with a change over time in the position of the first subject as determined from recurring instances of the receiving that occur on the second recurring basis by the overlapping. In some embodiments, the center of the first sub-view is associated with position coordinates (e.g., XYZ) generated by a tracking device worn or otherwise associated with the subject. In some embodiments, a subject may wear multiple tracking devices and the first sub-view is centered based on a set of coordinates generated based on tracking data from the plurality of devices. For example, device data from multiple tracking devices worn by a subject may be correlated, e.g., based on timestamp data, and a geometric or other center set of coordinates may be computed based on the coordinates generated by the respective tracking devices.

In some embodiments, the first sub-view of the central video feed is communicated to a remote device (e.g., user device 700 of FIG. 7) independent of the central video feed. Accordingly, the communicating causes the remote device to display the first sub-view of the central video feed. By way of non-limiting example, the remote device is a hand-held device such as a smart phone, a tablet, a gaming console, a fixed computer system such as a personal home computer, or the like. Moreover, the communicating can occur wirelessly (e.g., wirelessly over network 106).

Figure 10C:
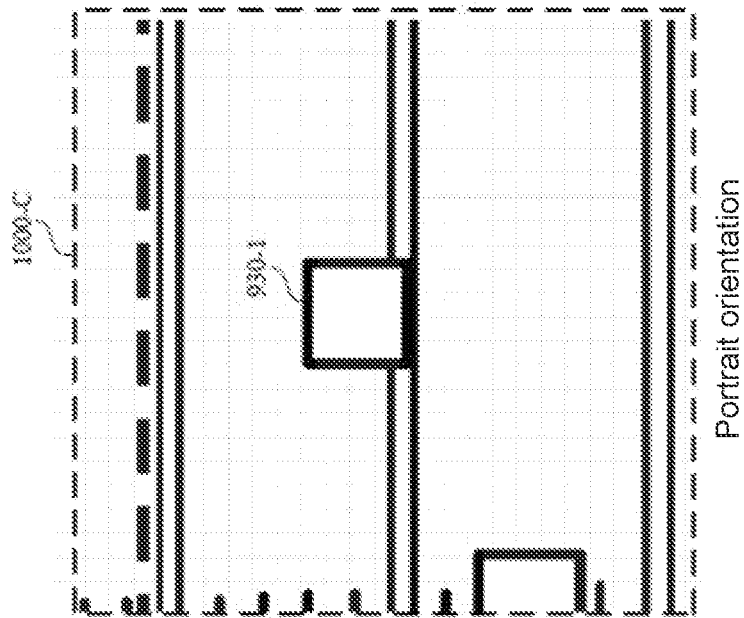
FIG. 10C shows an example of a first sub-view and a second sub-view according to an embodiment of the present disclosure.

In various embodiments, at least a first subject in the subset of subjects is selected (e.g., selecting sub-view 1000-C of FIG. 10C). The selection of the at least first subject can be conducted via the computer system 48 for example by an operator of the computer system 48 (e.g., a video production specialist, a producer, a director, etc.), an end user of each respective remote device (e.g., via a respective user device 700), or automatically. For example, a first subject is selected automatically based at least in part on proximity (being within a threshold distance) to a ball or other subject (for example, a previously selected subject with which the subject is associated, such as in a one-on-one match or by being associated with complementary positions, such as opposing offensive and defensive linemen). Moreover, a sub-view may be selected from a wider collection of sub-views (e.g., a list of available sub-views, a preview of available sub-view, etc.). The wider collection of sub-views includes a sub-view for each player active in a competitive game (e.g., twenty-two sub-views for an American football game). This end-user selection allows for each user to select one or more subjects according to their desire. For instance, if the end-user has a list of favorite subjects spread across multiple teams, the end-user may view sub-views of each of these favorite subjects on a single remote device and/or display.

In some embodiments, an identity of the first subject is received at the remote device. For instance, the first sub view includes information related to the identity of the first subject (e.g., a name of the first subject). This identity of the respective subject allows for an end-user to quickly identify different sub views when viewing more than one sub view. In some embodiments, a tracking device 300 is attached to (e.g., embedded within) a ball that is being used in the competitive sport on the spatial region. Accordingly, the identity of the first subject is determined, without human intervention, based on a determination of which subject in the plurality of subjects is currently closet to the ball using the respective transmission of time-stamped positional information from each tracking device 300.

In various embodiments, one or more steps of process 800 occurs during a live game in which the plurality of subjects is participating. However, the present disclosure is not limited thereto. For instance, the communicating can occur after a live game (e.g., such as viewing highlights of the live game or a replay of the live game).

Figure 9:
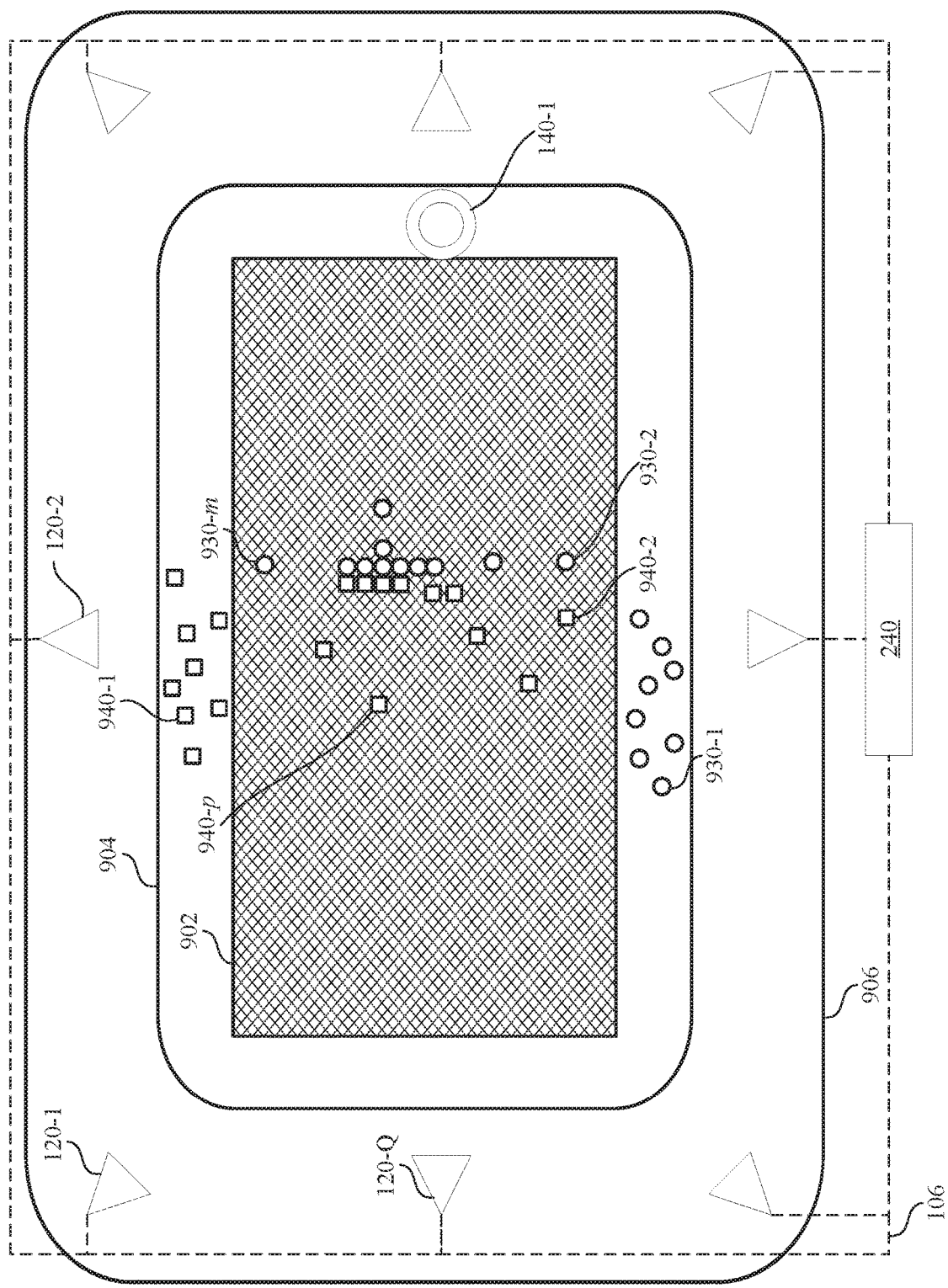
FIG. 9 shows an example environment including a field of play that includes components of a tracking according to an embodiment of the present disclosure.

FIG. 9 shows an example environment including a field of play that includes components of a tracking according to an embodiment of the present disclosure. An exemplary environment (e.g., stadium 906) 900. The environment 900 includes a field of play 902 in which a game is played (e.g., a football game). The environment 900 includes a region 904 that includes the field of play 902 and an area immediately surrounding the field of play (e.g., an area that includes subjects not participating in the game such as subject 930-1 and subject 940-1). The environment 900 includes an array of anchor devices 120 (e.g., anchor device 1201-1, anchor device 120-2, . . . , anchor device 120-Q) that receive telemetry data from one or more tracking devices 300 associated with a respective subject of the game. As illustrated in FIG. 9, in some embodiments the array of anchor devices is in communication (e.g., via communication network 106) with a telemetry parsing system 240 (e.g., tracker management system 400 of FIG. 4). Moreover, in some embodiments one or more cameras 140 (e.g., camera 140-1) capture images and/or video of the sports event, which is used in forming the virtual reproduction. In FIG. 9, markers 930 represent subjects a first team of the game while markers 940 represents subjects of a second team of the game.

FIG. 10A shows an example of a central video feed according to an embodiment of the present disclosure. An exemplary virtual reproduction 1000-A is illustrated. This virtual reproduction 1000-A includes some or all of the above described virtual reproductions (e.g., virtual reproduction 900 of FIG. 9) but illustrated at different viewing perspective (e.g., birds eye view, wide angle view). For instance, in some embodiments an end user of a remote device 700 is enabled to between one or more virtual reproductions of a game, with each reproduction virtual reproduction having a unique viewing perspective and/or unique level of detail within the virtual reproduction (e.g., a high quality reproduction that includes one or more optional elements such as end zones 908 and a lower quality reproduction that omits one or more optional elements).

Figure 10B:
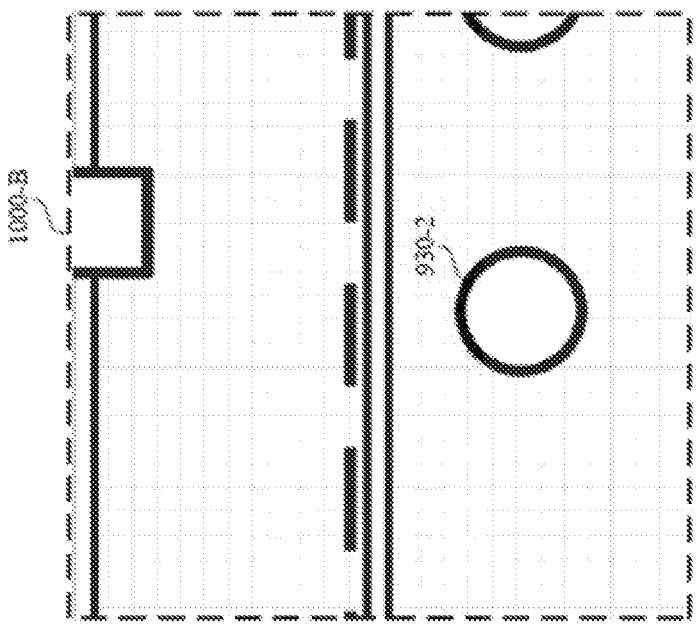
FIG. 10B shows an example of a first sub-view and a second sub-view according to an embodiment of the present disclosure.

FIGS. 10B and 10C show examples of a first sub-view and a second sub-view according to an embodiment of the present disclosure. The techniques disclosed herein can be applied to virtual scenes or video captured by cameras. FIGS. 10A-10C represent actual video frames and are not necessarily a sub-view of a composed/virtual scene. In some embodiments, the selecting further includes selecting a second subject in the subset of subjects, other than the first subject. The defining further includes defining a second sub-view (e.g., sub-view 1000-C of FIG. 10C) of the central video feed at the second resolution. In some embodiments, the second sub-view is at a third resolution that is less than the first resolution and different than the second resolution.

The central video feed can be captured in one type of orientation (e.g., landscape), while sub-views are displayed in one or more other orientations (e.g., all or portrait or some are portrait). In this example, the central video feed (FIG. 10A) is captured in a landscape orientation and each sub-view (FIGS. 10B and 10C) is partitioned in a portrait orientation.

The coordinates of a center of the second sub-view within the central video feed changes over time, without human intervention, in accordance with a change over time in the position of the second subject as determined from recurring instances of the receiving that occur on the second recurring basis by the overlapping. Accordingly, the communicating further communicates to the remote device the second sub-view of the central video feed independent of the central video feed. Thus, an end user of the remote device is enabled to view a first sub-view dedicated to a first subject and a second sub-view dedicated to a second subject. The first and second subjects can be participating in the same game or different games (e.g., a first game and a second game). The first game and the second game are played concurrently, are historical games that have already been played, or the first game is a present game and the second game is a historical game. Furthermore, the first and second subject can be on the same team or different teams. Moreover, in some embodiments the second sub-view is defined but not communicated to the remote device.

In some embodiments, the first subject and the second subject are at the same position in the spatial region at a first time point (e.g., both players are involved in a scrum for the ball, both players are in pile-up for the ball, etc.). Since the first subject and the second subject are at the same position same position in the spatial region at a time point, this causes the first sub-view to overlap with the second sub-view at the first time point. Further, the first subject and the second subject are at different positions in the spatial region at a second time point. This difference causes the first sub-view to not overlap the second sub-view at the second time point. Since the present disclosure utilizes time-stamped positional information (e.g. telemetry data 230) to determine a position of a subject in a video feed, instead of analyzing the optical characteristics of images captured by a camera 140, different objects are capable of being independently tracked, without interruption, when the different objects occupy a same location.

The techniques discussed herein may be applied to display more than two sub-views. For example, the plurality of sub-views includes three or more sub-views such as a view for each player on a side of a football game, (e.g., a view for each player in a fantasy team of football players) or on the order of 100 views. Each sub-view in the plurality of sub-views is centered on a different subject in the subset of subjects. In some embodiments, centering on a respective subject for each sub-view includes allocating a tolerance on a position of the subject and a center of the sub-view. For instance, if a tolerance of the positional information is approximately 15 centimeters, then, a center of the sub-view does not change unless the positional information indicates a change of position greater than and/or equal to 15 centimeters. Thus, any jumps or jitteriness in the positional information is not translated to the sub-view, ensuring that the sub-view provides a smooth (e.g., lacking jitter) video stream.

In some embodiments, the central video feed is not communicated to the remote device. For instance, the central video feed is stored in a database of the present disclosure. Similarly, each subject for each respective subject captured by the central video feed is stored in a database of the present disclosure. This storing allows for a collection of dedicated videos to be curated for each respective subject. The collection can then be utilized, for instance, to view each play a respective subject participates in over a period of time (e.g., a game, a season, a career, etc.).

In some embodiments, the plurality of subjects includes a first team and a second team. In some embodiments, the first team and the second team form a league of teams (e.g., a football league, a soccer league, a basketball association, etc.). The first team includes a first plurality of players (and the second team includes a second plurality of players. The first team and the second team are engaged in a present game during the receiving, the receiving, the overlapping, the selecting, the defining, and the communicating. The selecting at least a first subject in the subset of subjects includes selecting each player in the first team that is actively engaged in the present game in the spatial region. The coordinates of a center of the first sub-view within the central video feed changes over time, without human intervention, in accordance with the change over time in the position of the first subject, and in accordance with a change over time in the position of each other player in the first team that is actively engaged in the present game in the spatial region, as determined from recurring instances of the receiving that occur on the second recurring basis by the overlapping.

In some embodiments, the selecting further includes selecting a second subject in the subset of subjects, other than the first subject. The defining further includes defining a second sub-view of the central video feed at the second resolution. The coordinates of a center of the second sub-view within the central video feed changes over time, without human intervention, in accordance with a change over time in the position of a second subject as determined from recurring instances of the receiving that occur on the second recurring basis by the overlapping). The communicating communicates to the remote device the second sub-view of the central video feed independent of the central video feed and the first sub-view.

In some embodiments, the defining further includes defining a plurality sub-views of the central video feed at the second resolution. The plurality of sub-views includes the first sub-view (e.g., sub-view 1000-B of FIG. 10B). The coordinates of a center of each sub-view in the plurality of sub-view within the central video feed changes over time, without human intervention, in accordance with a change over time in the position of a corresponding subject in the subset of subjects that is actively engaged in a present game in the spatial region from recurring instances of the receiving that occur on the second recurring basis by the overlapping. The communicating communicates to the remote device each sub-view in the plurality of sub-views independent of the central video feed.

Thus, through the systems and methods of the present disclosure one or more dedicated sub-views derived from a central video feed is communicated to a remote device. Each respective dedicated sub-view is centered on a corresponding subject, which allows for the end-user to view a video feed that is exclusively dedicated that the corresponding subject (e.g., a video feed dedicated to a favorite player of an end-user). This enables the end user to view a selection of one or more dedicated sub-views of subjects according to a selection of the user, such as a selection of subjects included in a fantasy football team of the user. For instance, if an end-user is a hopeful professional athletic, the end-user may choose to view sub-view that are dedicated to subjects that play a same position as the end-user to use as training video. Further, since the central video feed is a high resolution video feed, each sub-view is partitioned without losing significant image quality. This allows for a single camera to produce any number of sub-views, which greatly reduces the number of cameras and operators required to capture a live sports event.

While the present disclosure describes various systems and methods in relation to a gridiron football game, one skilled in the art will recognize that the present disclosure is not limited thereto. The techniques disclosed herein find application in games with a discrete or finite state where a player or team has possession of a ball (e.g., holding the ball) as well as other types of events. For instance, in some embodiments the systems and methods of the present disclosure are applied to events including a baseball game, a basketball game, a cricket game, a football game, a handball game, a hockey game (e.g., ice hockey, field hockey), a kickball game, a Lacrosse game, a rugby game, a soccer game, a softball game, or a volleyball game, auto racing, boxing, cycling, running, swimming, tennis etc., or any such event in which a location of a subject is relevant to an outcome of the event.

The present disclosure addresses the need in the art for improved systems and methods for delivering video content to remote devices. In particular, the present disclosure facilitates increased spectators' engagement and interest in the live sport event by partitioning a video feed to segment live player activity.

With regard to expected points evaluation, multinomial logistic regression, or other types of analysis, can be used for estimating the probabilities of each next event that is possible outcome of a given play situation. The next event is a scoring event or a non-scoring event. The scoring events include a touchdown of a team in possession of the ball (7 points), field goal of a team in possession of the ball (3 points), safety of a team in possession of the ball (2 points), opponent's safety (−2 points), opponent's field goal (−3 points), and opponent's touchdown (−7 points). Non-scoring events (0 points) include events that describe attempts the team in possession of the ball may take. In one instance, the team in possession of the ball may attempt to advance the ball to the left, to the right or down the middle in the next play. In another instance, the team in possession of the ball may attempt to pass the ball or run the ball in the next play.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to partition a video feed to segment live player activity, the system comprising:
   a communication interface configured to:
   receive, on a first recurring basis, a transmission of a central video feed from a first camera, wherein the central video feed is calibrated against a spatial region represented in at least two dimensions that is encompassed by the central video feed and the central video feed is at a first resolution such that the central video feed is partitionable into sub-views, each sub-view meeting a threshold resolution; and
   receive, on a second recurring basis, a respective time-stamped position information from each tracking device in a plurality of tracking devices; and
   a processor coupled to the communication interface and configured to:
   use the received time-stamped position information and the calibration of the central video feed to define a first sub-view of the central video feed, the first sub-view being associated with a first subject associated with a first tracking device included in the plurality of tracking devices and the first sub-view comprising for each of a plurality of frames comprising the central video feed a corresponding sub-frame associated with the first subject, wherein the first sub-view is at a second resolution lower than the first resolution; and cause the first sub-view to be communicated to a device configured to display the first sub-view.

2. The system of claim 1, wherein the calibration of the central video feed against a spatial region is based at least in part on known information about the spatial region.

3. The system of claim 2, wherein the known information about the spatial region includes at least one of: boundary lines, lines of known and uniform dimensions, lines of known lengths or thicknesses, locations, or regulation.

4. The system of claim 2, wherein the known information about the spatial region includes location of a camera relative to the spatial region.

5. The system of claim 4, wherein the camera is fixed such that the camera is limited in movement in at least one dimension.

6. The system of claim 4, wherein the camera is in a fixed location with known at least one of: tilt, pan, or zoom.

7. The system of claim 1, wherein the first sub-view is a different form factor than the central video feed.

8. The system of claim 1, wherein the first sub-view is one of portrait orientation or landscape orientation and the central video feed is the other one of portrait orientation or landscape orientation.

9. The system of claim 1, wherein the first sub-view tracks the first subject as the first subject moves through the spatial region including by tracking corresponding positional information.

10. The system of claim 1, wherein the first subject is selected by a user at a remote device.

11. The system of claim 1, wherein the first subject is selected automatically based at least in part on being within a threshold distance to a ball or other subject.

12. The system of claim 1, wherein the first sub-view is communicated independently from the central video feed.

13. The system of claim 1, wherein the first sub-view includes information related to an identity of the first subject, the identity is displayable, and the identity is selectable within the first sub-view for display.

14. The system of claim 1, wherein the processor is further configured to use the received time-stamped position information and the calibration of the central video feed to define a second sub-view of the central video feed, wherein the second sub-view is associated with a second subject in at least one of: the same competition, a different concurrent live competition, or a historical competition.

15. The system of claim 1, wherein each subject in the first subject has a plurality of sensors configured to collect sensor data and the processor is further configured to:
identify a geometric center or other point or range of points based at least in part on the collected sensor data and collective tracking information for first subject; and
define the first sub-view based at least in part on the identified geometric center or other point or range of points.

16. The system of claim 1, wherein the video feed is a live sport event involving (i) a first team comprising a first set of subjects that includes the first subject and (ii) a second team comprising a second set of subjects.

17. A method to partition a video feed to segment live player activity, the method comprising:
receiving, on a first recurring basis, a transmission of a central video feed from a first camera, wherein the central video feed is calibrated against a spatial region represented in at least two dimensions that is encompassed by the central video feed and the central video feed is at a first resolution such that the central video feed is partitionable into sub-views, each sub-view meeting a threshold resolution;
receiving, on a second recurring basis, a respective time-stamped position information from each tracking device in a plurality of tracking devices;
using the received time-stamped position information and the calibration of the central video feed to define a first sub-view of the central video feed, the first sub-view being associated with a first subject associated with a first tracking device included in the plurality of tracking devices and the first sub-view comprising for each of a plurality of frames comprising the central video feed a corresponding sub-frame associated with the first subject, wherein the first sub-view is at a second resolution lower than the first resolution; and
causing the first sub-view to be communicated to a device configured to display the first sub-view.

18. The method of claim 17, wherein the first sub-view tracks the first subject as the first subject moves through the spatial region including by tracking corresponding positional information.

19. The method of claim 17, wherein the first subject is selected by a user at a remote device.

20. A computer program product embodied in a non-transitory computer readable storage medium and comprising computer instructions for:
receiving, on a first recurring basis, a transmission of a central video feed from a first camera, wherein the central video feed is calibrated against a spatial region represented in at least two dimensions that is encompassed by the central video feed and the central video feed is at a first resolution such that the central video feed is partitionable into sub-views, each sub-view meeting a threshold resolution;
receiving, on a second recurring basis, a respective time-stamped position information from each tracking device in a plurality of tracking devices;
using the received time-stamped position information and the calibration of the central video feed to define a first sub-view of the central video feed, the first sub-view being associated with a first subject associated with a first tracking device included in the plurality of tracking devices and the first sub-view comprising for each of a plurality of frames comprising the central video feed a corresponding sub-frame associated with the first subject, wherein the first sub-view is at a second resolution lower than the first resolution; and
causing the first sub-view to be communicated to a device configured to display the first sub-view.

* * * * *